(12) United States Patent
Saito

(10) Patent No.: US 6,382,177 B1
(45) Date of Patent: May 7, 2002

(54) FUEL INJECTION CONTROL SYSTEM FOR A DIESEL ENGINE

(75) Inventor: Tomoaki Saito, Fuchu-cho (JP)

(73) Assignee: Mazda Motor Corporation (JP)

( * ) Notice: Subject to any disclaimer, the term of this patent is extended or adjusted under 35 U.S.C. 154(b) by 73 days.

(21) Appl. No.: 09/640,350

(22) Filed: Aug. 16, 2000

(30) Foreign Application Priority Data

Aug. 18, 1999 (JP) .............................................. 11-231358

(51) Int. Cl.$^7$ .................................................. F02B 3/00
(52) U.S. Cl. ...................................... 123/299; 123/701
(58) Field of Search .............................. 123/299, 300, 123/479, 701, 105, 114

(56) References Cited

U.S. PATENT DOCUMENTS

| | | | |
|---|---|---|---|
| 5,713,328 A | * | 2/1998 | Anderson et al. ........... 123/299 |
| 5,740,775 A | * | 4/1998 | Suzuki et al. ............... 123/299 |
| 6,164,264 A | * | 12/2000 | Thomas ...................... 123/300 |

FOREIGN PATENT DOCUMENTS

| | | |
|---|---|---|
| DE | 38 02 161 A | 7/1989 |
| DE | 41 33 856 A | 4/1993 |
| DE | 196 39 172 A | 4/1998 |
| DE | 196 46 652 C | 5/1998 |
| EP | 0 767 303 A | 4/1996 |
| EP | 0 786 592 A | 7/1997 |
| JP | 09158810 | 6/1997 |

* cited by examiner

*Primary Examiner*—Bibhu Mohanty
(74) *Attorney, Agent, or Firm*—Brooks & Kushman, P.C.

(57) ABSTRACT

In a direct injection diesel engine in which fuel to be sprayed during a primary injection is split and sprayed at a plurality of timings at a point of time near top dead center of a compression stroke of a cylinder, a judger judges that a completion timing of the primary injection is later than a point of time corresponding to 35° after top dead center of a compression stroke when the primary injection is split while an engine is operated. Upon such a judgment, a split number of the primary injection and an injection intermission interval are reduced by a corrector to advance the injection completion timing. Further, an amount of fuel to be sprayed during the primary injection is reduced for correction, and a part of the fuel is preliminarily sprayed during the second half of the compression stroke of the cylinder by an auxiliary injection controller so as to respond to such a correction. Even in such an operating condition to require a larger amount of fuel to be sprayed, deterioration of fuel consumption and an increase of emissions can be prevented by hindering retardation of the injection completion timing later than the point of time corresponding to 35° after top dead center of the compression stroke.

9 Claims, 15 Drawing Sheets

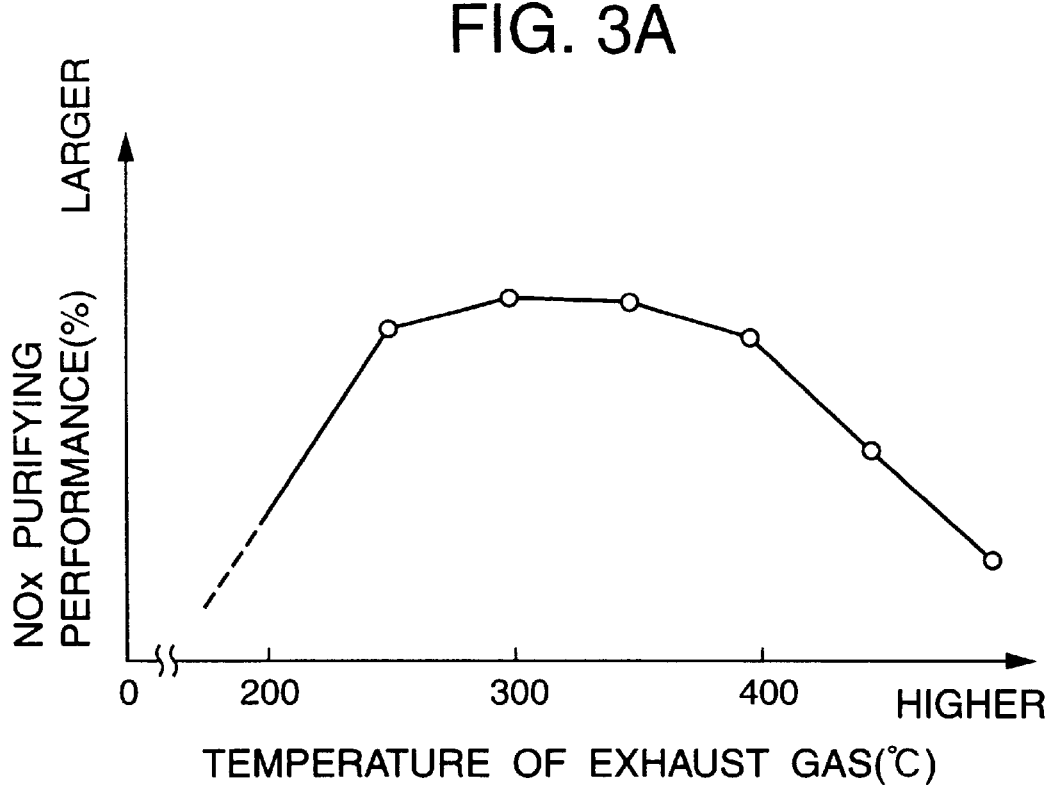
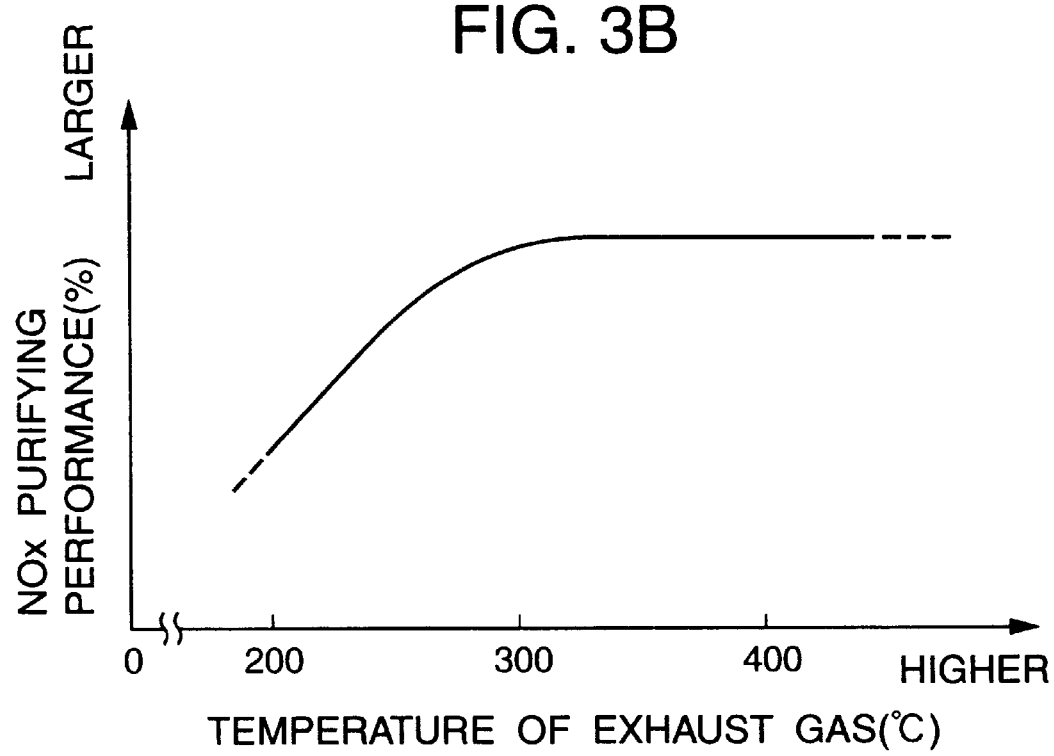

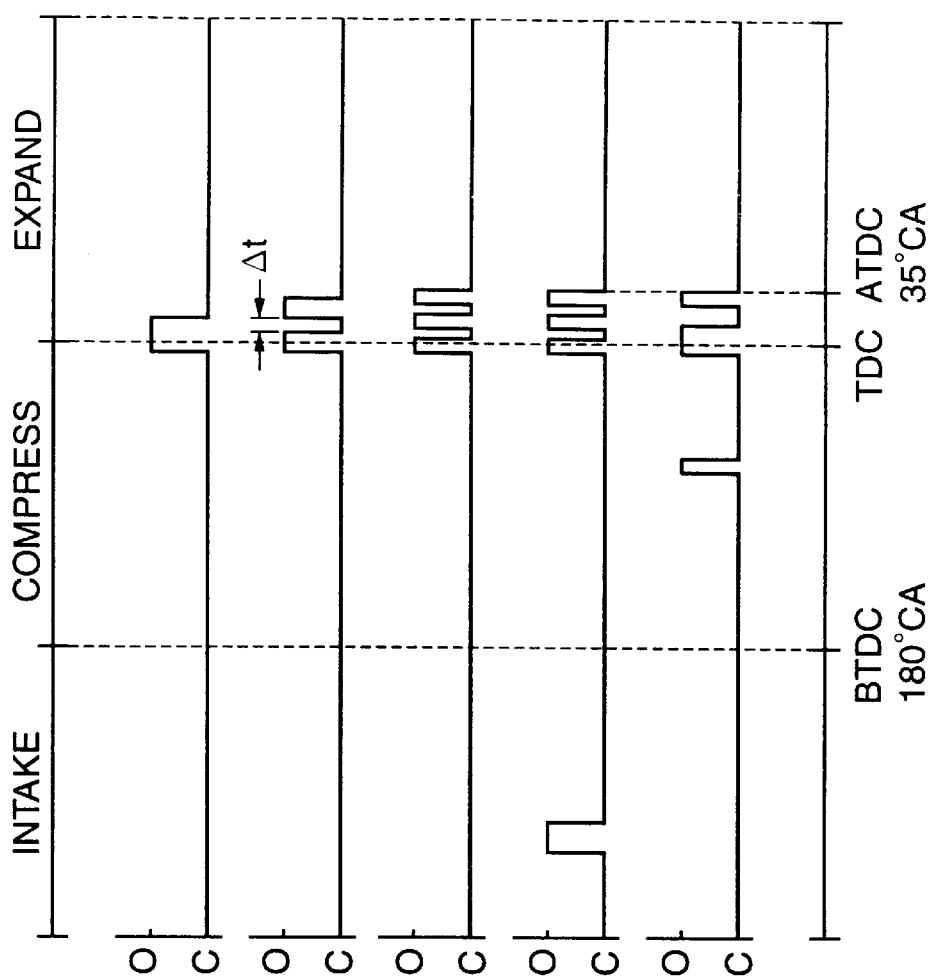
FIG. 4A ONE-SHOT INJECTION
FIG. 4B TWO-SPLIT INJECTION
FIG. 4C THREE-SPLIT INJECTION
FIG. 4D ACCOMPANIED BY PRELIMINARY INJECTION($\lambda \leq 1$)
FIG. 4E ACCOMPANIED BY PRELIMINARY INJECTION

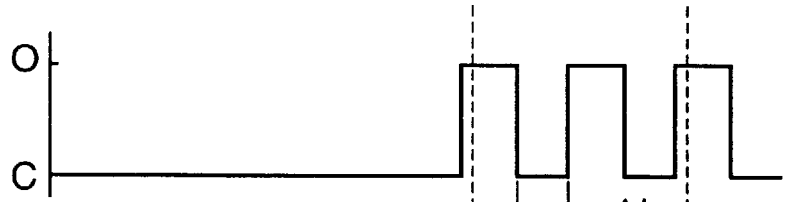
FIG. 15A
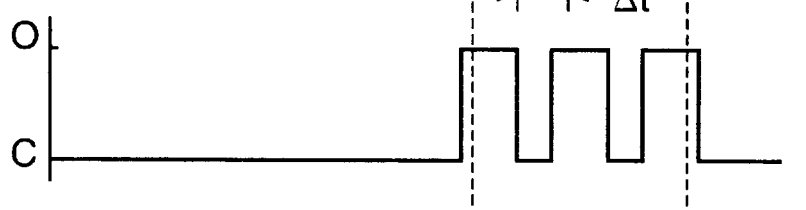
FIG. 15B
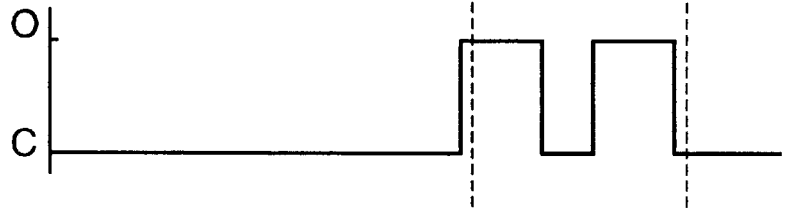
FIG. 15C
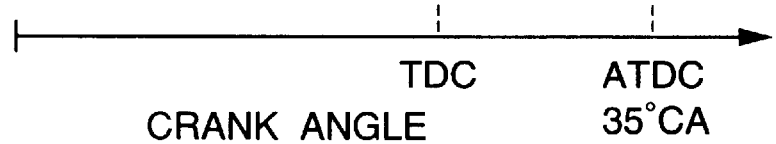

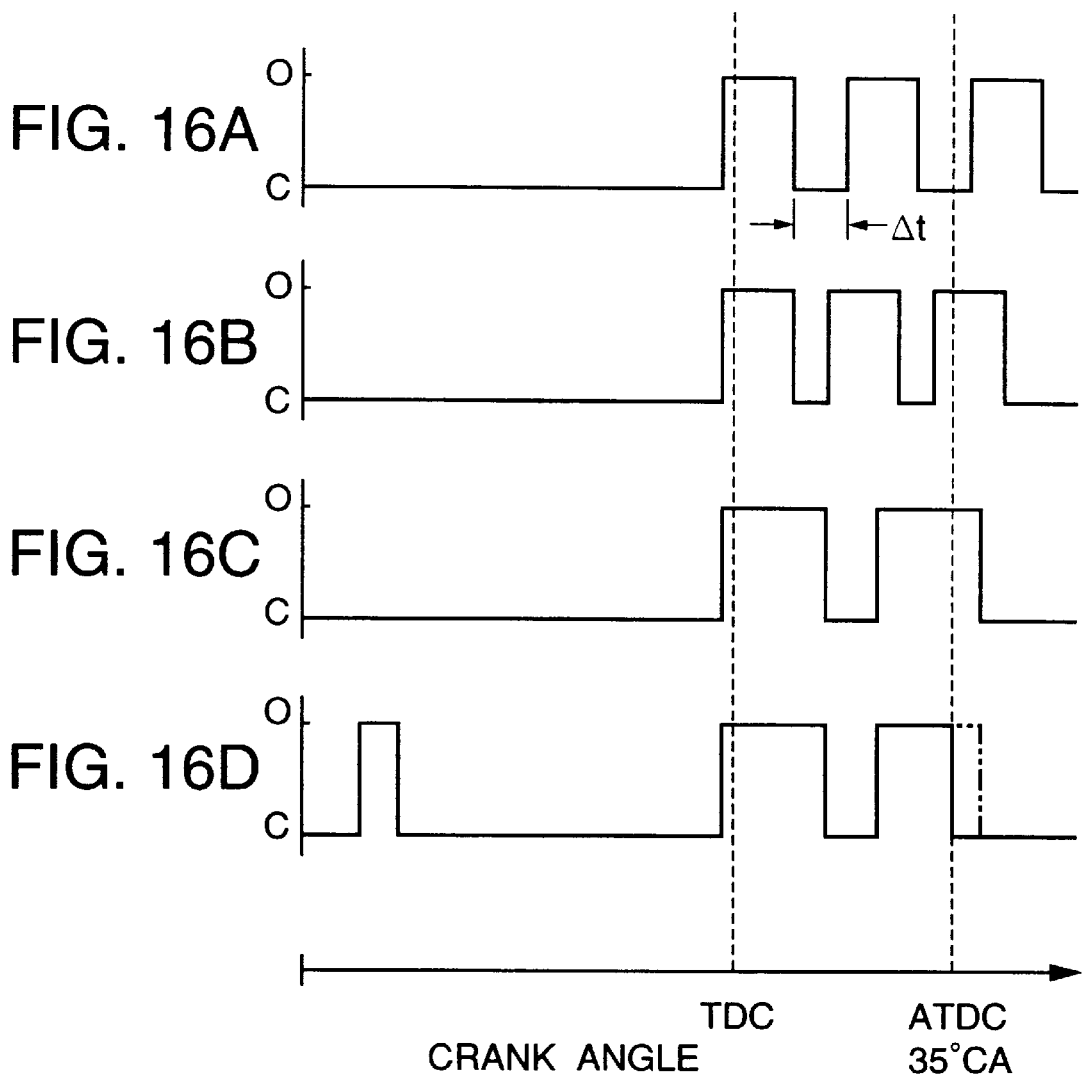

FUEL INJECTION CONTROL SYSTEM FOR A DIESEL ENGINE

BACKGROUND OF THE INVENTION

This invention relates a fuel injection control system for a diesel engine for causing fuel to be sprayed into a combustion chamber of a cylinder of the engine a plurality of times at least at a point of time near top dead center of a compression stroke of the cylinder.

A known fuel injection control system of this type is adapted to spray fuel during an intake stroke and at a point of time near top dead center of a compression stroke as disclosed, for example, in Japanese Unexamined Patent Publication No. 9-158810. In this control system, a part of the fuel is first preliminarily sprayed by a fuel injector during the intake stroke of a cylinder and sufficiently mixed with an intake air in a combustion chamber to form a preliminary lean air-fuel mixture, and the remaining fuel is sprayed at a point of time near top dead center of the compression stroke of the cylinder to cause an autoignition. In this way, the preliminary lean air-fuel mixture is satisfactorily burnt, to reduce an exhaust of smoke while suppressing production of NOx.

In the above prior art diesel engine, production of NOx is further suppressed by retarding a timing of the primary injection performed at a point of time near top dead center of the compression stroke of the cylinder. In addition to this, it has been proposed to split the primary injection and perform it twice in order to prevent a part of the lean air-fuel mixture from being exhausted while being unburnt. By splitting the primary injection, the fuel is more fully burnt, so that the diesel engine can be highly efficiently operated with low emissions of toxic exhaust components.

However, if the primary injection is retarded as in the prior art, the completion timing of the primary injection is retarded. Further, if the primary injection is split and performed a plurality of times, the completion timing of the primary injection is retarded by the intermission intervals between the split injections. Thus, under an operating condition where a larger output is required for an engine and, accordingly, a larger amount of fuel needs to be sprayed, most of the fuel sprayed at a final stage of the primary injection is exhausted without being sufficiently burnt, resulting in a poor fuel consumption and a bad influence on environments due to a larger ratio of unburnt gases to burnt gases.

For example, in a low engine rotation speed operating condition of the engine such as an idle operating condition, a fuel injection pressure by an injector is relatively set low in order to cause a spray of the fuel to suitably spread in the combustion chamber. If the engine enters an accelerating state in this condition, a fuel injection amount has to be sharply increased despite a low fuel injection pressure. This extends a valve opening period of the injector as a matter of course, with the result that the above problems are likely to occur.

SUMMARY OF THE INVENTION

It is an object of the present invention to provide a fuel injection control system for a diesel engine which is free from the problems residing in the prior art.

According to an aspect of the invention, whether or not an injection completion timing is later than a point of time corresponding to a specified crank angle is judged when fuel sprayed during the primary injection is split and sprayed at different timings near top dead center of a compression stroke of each cylinder. There is provided a corrector for correcting a mode of the fuel injection by the split injection controller when the primary injection completion timing is judged to be later than the point of time corresponding to the specified crank angle.

It may be preferable to correct at least one of the number of split injections, an injection intermission interval and a fuel injection pressure to advance the injection completion timing when the injection completion timing is judged to be later. Alternatively, it may be preferable to reduce the amount of fuel to be sprayed during the primary injection for correction to advance the injection completion timing, and perform an auxiliary fuel injection separately when the injection completion timing is judged to be later.

Accordingly, it can be assuredly accomplished to prevent deterioration of fuel consumption and increase in emissions resulting from an excessive retardation of an injection completion timing.

These and other objects, features, aspects, and advantages of the present invention will become more apparent from the following detailed description of the preferred embodiments/examples.

BRIEF DESCRIPTION OF THE DRAWINGS

FIGS. 3A and 3B are graphs showing exemplary temperature dependencies of a NOx absorbing/purifying performance by a NOx absorbing material and of a NOx reducing/purifying performance by a catalytic metal;

FIGS. 4A to 4E are timing charts of different modes of a primary injection, wherein FIGS. 4A to 4C show one-shot injection, two-split injection and three-split injection, and FIGS. 4D and 4E show primary injections accompanied by preliminary injections;

FIGS. 15A to 15C are timing charts showing a procedure to advance an injection completion timing by correcting an intermission interval and the number of the split primary injections;

FIGS. 16A to 16D are timing charts showing a procedure to perform a reductive correction of a fuel injection amount and a preliminary injection after the intermission interval and the number of the split primary injections are corrected.

DETAILED DESCRIPTION OF THE PREFERRED EMBODIMENTS OF THE INVENTION (Entire Construction)

Figure 1:
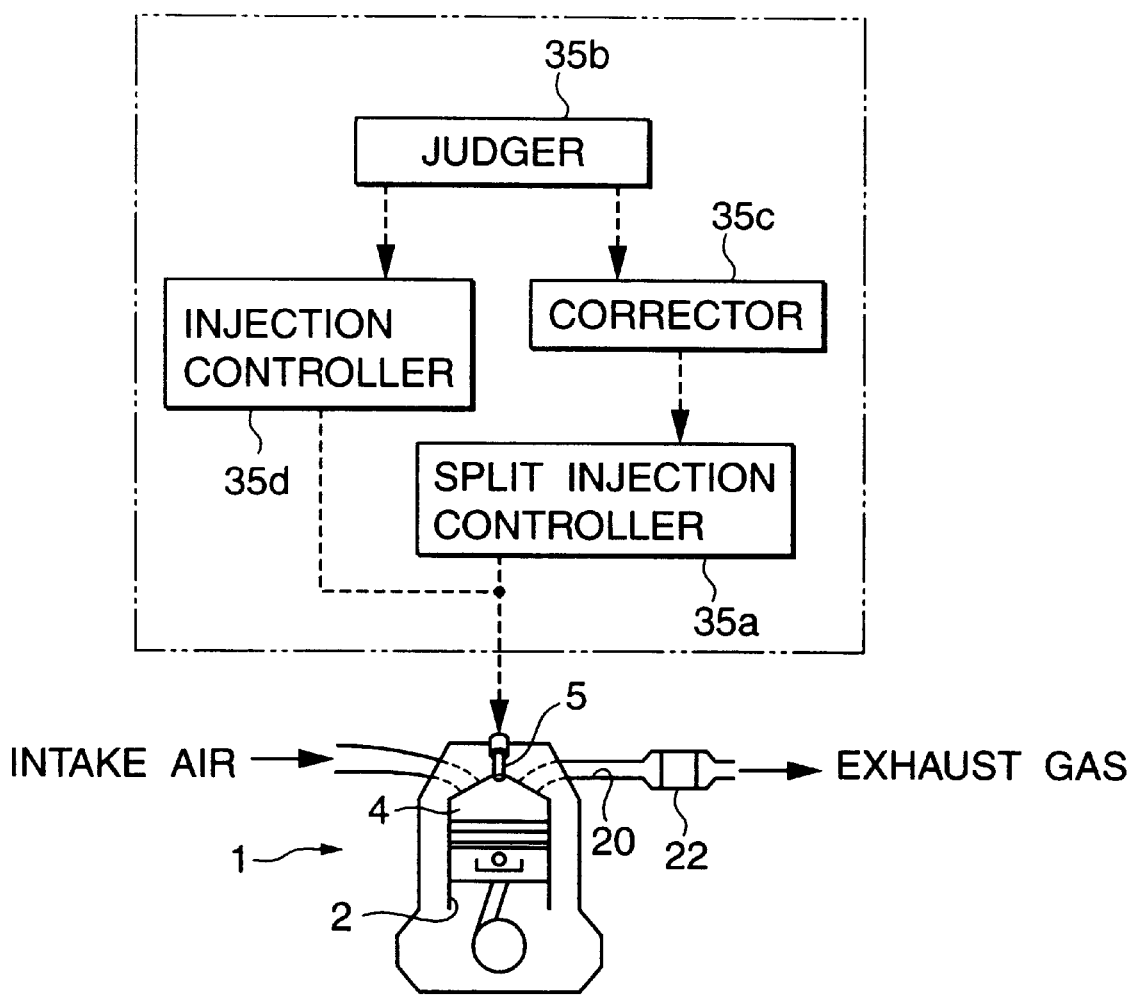
FIG. 1 is a diagram showing a construction of a fuel injection control system according to an embodiment of the invention.
Figure 2:
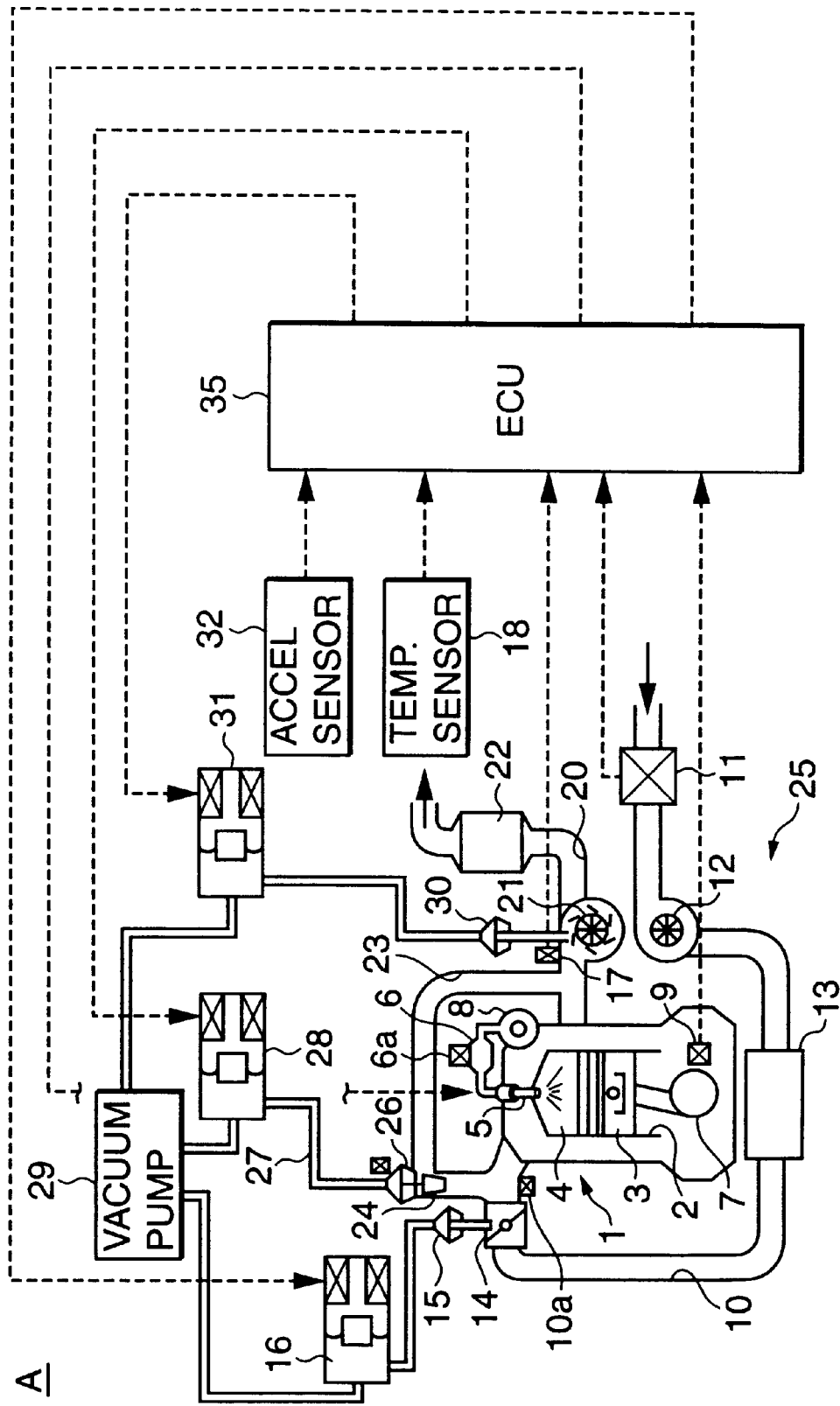
FIG. 2 is a diagram showing a detailed construction of the fuel injection control system.

FIG. 2 shows an entire construction of a fuel injection control system A for a diesel engine according to an embodiment of the invention. Identified by 1 is a multi-cylinder diesel engine mounted in a vehicle. The engine 1 is provided with a plurality of cylinders 2 (only one cylinder is shown), in each of which a reciprocally movable piston 3 is fitted to define a combustion chamber 4 in each cylinder 2. A fuel injector 5 having a valve is provided substantially at the center of the upper surface of the combustion chamber 4, such that an injection bore at the leading end thereof faces the combustion chamber 4. The fuel injector 5 is opened and closed at specified injection timings of each cylinder 2 to directly spray fuel into the combustion chamber 4.

The respective fuel injectors 5 are coupled to a common rail 6 which is a common pressure accumulating chamber for storing the fuel in a high-pressure state. The common rail 6 is provided with a pressure sensor 6a for detecting a fuel pressure (common rail pressure) therein, and a high-pressure supply pump 8 driven by a crank shaft 7 is connected thereto. The fuel pressure in the common rail 6 is held at a specified value corresponding to an operating condition of the engine 1 by actuating the high-pressure supply pump 8. Further, a crank angle sensor 9 formed by an electromagnetic pickup for detecting a rotational angle of the crank shaft 7 is provided. The crank angle sensor 9 is so provided as to face an outer surface of a detectable plate (not shown) provided at an end of the crank shaft 7, and outputs a pulse signal in synchronism with passage of protuberances formed on the outer surface of the detectable plate.

At one side of the engine 1, an intake manifold 10 for supplying an intake air filtered by an unillustrated air cleaner is connected with the combustion chambers 4 of the respective cylinders 2, and a downstream end of the intake manifold 10 is branched to be individually connected with the respective cylinders via an unillustrated surge tank, and the branched passages communicate with the combustion chambers 4 of the respective cylinders 2 via intake ports. An intake pressure sensor 10a for detecting a supercharged pressure supplied to the respective cylinders 2 is provided in the serge tank. An air flow sensor 11 of hot film type for detecting a flow rate of the intake air charged into the engine 1, a blower 12 for compressing the intake air by being driven by a turbine 21 to be described later, an intercooler 13 for cooling the intake air compressed by the blower 12, and an intake throttle valve 14 are provided in this order from an upstream side to a downstream side along the intake manifold 10. The throttle valve 14 is made of a butterfly valve formed with a notch so that an intake air can flow even in a fully closed state. Similar to an EGR valve 24 to be described later, an opening of the throttle valve 14 is controlled by adjusting a vacuum acting on a diaphragm 15 by an electromagnetic valve 16 for controlling a vacuum.

On the other hand, an exhaust manifold 20 for discharging an exhaust gas from the combustion chambers 4 of the respective cylinders 2 is connected at the other side of the engine 1 (right side in FIG. 2). An upstream end of the exhaust manifold 20 is branched to individually communicate with the combustion chambers 4 of the respective cylinders 2 via unillustrated exhaust ports. An $O_2$ sensor 17 for detecting an oxygen concentration in the exhaust gas is provided at a converged portion of the exhaust manifold 20. A water temperature sensor 18 for detecting a temperature of a coolant (engine water temperature) is so provided as to face a water jacket of the engine 1. The turbine 21 rotated by a flow of the exhaust gas and a catalyst 22 for purifying toxic components in the exhaust gas are provided in this order from an upstream side to a downstream side along the exhaust manifold 20. Though not shown in detail, a turbosupercharger 25 comprised of the turbine 21 and the blower 12 is a variable geometry turbosupercharger which has a plurality of flaps which are so arranged as to surround the entire circumference of the turbine 21 and adjusts a flow rate of the exhaust gas to the turbine 21 by changing a cross section of a nozzle by the rotation of the respective flaps.

The catalyst 22 includes a cordierite honeycomb substrate (carrier member) having a number of bores extending in parallel with one another in an axial direction (a direction of an exhaust gas flow), and two catalyst layers are formed on the wall surfaces of the respective bores. Specifically, the lower catalyst layer contains a precious metal such as platinum Pt and barium Ba as a NOx absorbing material, and a porous material such as alumina or ceria on which Ba and Pt are supported. On the other hand, the upper catalyst layer contains Pt, rhodium Rh, Ba and a porous material such as zeolite on which the Pt, Rh, Ba are supported.

The catalyst 22 is of an absorption/reduction type that, on one hand, absorbs NOx when the oxygen concentration of the exhaust gas is high, in other words, when an air-fuel ratio in the combustion chamber 4 is large and, on the other hand, releases NOx to reduce and purify them when the oxygen concentration of the exhaust gas becomes lower as a result of combustion of a stoichiometric or richer air-fuel mixture in the combustion chamber 4. The NOx absorption/release action by Ba depends upon temperatures. For example, as shown in FIG. 3A, while the catalyst 22 shows a significantly high purification efficiency by the absorption of NOx in the exhaust gas in a temperature range between about 250 and 400° C., it sharply lowers the purification efficiency as decreasing its temperature in a temperature range below about 250° C. where it remains inactive not being sufficiently warmed up. The purification efficiency increases as the temperature of the catalyst 22 increases in a temperature range above about 400° C. Further, since the catalytic activity of the precious metal such as Pt decreases when the temperature of the catalyst 22 is low, the purification efficiency during the reduction and purification of the NOx released from Ba sharply decreases in a temperature range below 250° C. as shown in FIG. 3B.

The catalyst 22 may contain at least one selected from a group of alkaline earth metals other than Ba, alkaline metals such as sodium (Na) and rare earth metals. In the case that the lower catalyst layer contains zeolite which may be used as the support material, the upper catalyst layer may contain alumina or ceria as the support material. The catalyst 22 may be of a single layer type in which a catalyst layer containing ceria and alumina as a support material that is applied to wall surfaces of the carrier, and a precious metal such as Pt, Rh, or palladium Pd and an alkaline metal such as K or an alkaline earth metal such as Ba are supported on the support material.

A converged portion of the exhaust manifold 20 upstream from the turbine 21 is connected with an upstream end of an exhaust gas recirculation (EGR) passage 23 through which the exhaust gas is partly recirculated into an intake air stream. A downstream end of the EGR passage 23 is connected with the intake manifold 10 in a position downstream from the intake throttle valve 14, and an exhaust gas recirculation (EGR) valve 24 which operates on a vacuum is provided in an intermediate position of the EGR passage 23 toward the downstream end to recirculate a part of the exhaust gas in the exhaust manifold 20 into the intake manifold 10 while regulating the flow rate thereof. Specifically, an opening of the EGR valve 24 is linearly adjustable. A diaphragm 26 for actuating the valve is connected with a vacuum pump (vacuum source) 29 by a vacuum passage 27, and a vacuum for driving the EGR valve 24 is adjusted to open and close the EGR valve 24 by actuating an electromagnetic valve 28 provided in the vacuum passage 27.

Similar to the EGR valve, a diaphragm 30 is mounted for the flaps of the turbosupercharger 25. An actuated amount of the flap is adjusted by adjusting a vacuum acting on the diaphragm 30 by an electromagnetic valve 31 for vacuum control.

The fuel injectors 5, the high-pressure supply pump 8, the intake throttle valve 14, the EGR valve 24, the flaps of the turbosupercharger 25 and the like operate in response to control signals from a control unit (engine control unit: hereinafter, "ECU") 35. On the other hand, at least an output signal from the pressure sensor 6a, an output signal (crank angle signal) from the crank angle sensor 9, an output signal from the air flow sensor 11, an output signal from the $O_2$ sensor 17, an output signal from the water temperature sensor 18, and an unillustrated signal representing an travel of an acceleration pedal upon depression by a driver from an acceleration pedal travel sensor 32 are inputted to the ECU 35.

When the fuel injectors 5 are operated to execute a fuel injection control, a fuel injection amount, a fuel injection timing and other factors are controlled according to an operating condition of the engine 1, and the pressure of the common rail 6, i.e. a fuel injection pressure by the operation of the high-pressure supply pump 8 is controlled. Further, the recirculation amount of the exhaust gas is adjusted by actuating the EGR valve 24 to control the air-fuel ratio in the combustion chamber 4 of each cylinder 2 according to the operating condition of the engine 1. In addition, an intake air amount is controlled by actuating the intake throttle valve 14, and the operation of the flaps of the turbosupercharger 25 is controlled.

(Fuel Injection Control)

Specifically, a fuel injection amount map for defining basic fuel injection amounts Q empirically determined according to changes of target torque and engine rotation speed of the engine 1 is electronically stored in a memory of the ECU 35. A basic fuel injection amount Qbase corresponding to an output required by the engine 1 is read from the fuel injection amount map based on a target torque calculated based on the output signal from the acceleration pedal travel sensor 32 and the output signal from the crank angle sensor 9. An amount of fuel corresponding to the required output is basically sprayed at a point of time near top dead center (TDC) of the compression stroke of each cylinder 2 (hereinafter, "primary injection"), and the engine 1 is operated in a state where the air-fuel ratio in each combustion chamber 4 is fairly large.

An injection mode map for defining an fuel injection mode at a point of time near TDC of the compression stroke of each cylinder 2 according to the target torque and the engine rotation speed similar to the fuel injection amount map is electronically stored in the memory of the ECU 35. An optimal injection mode is selected from this map based on the target torque and the engine rotation speed of the engine 1. Specifically, selection is made as to whether the fuel is sprayed at a point of time near TDC of the compression stroke all at once (hereinafter, "one-shot injection") as shown in FIG. 4A, twice in a split manner (hereinafter, "two-split injection") as shown in FIG. 4B or three times in a split manner (hereinafter, "three-split injection") as shown in FIG. 4C. In the case of the two-split injection or three-split injection, an injection intermission interval At is changed to change a state of combustion so as to optimize the fuel consumption performance, the exhaust characteristics and the like of the engine 1.

On the other hand, if a reduction of the NOx absorbing performance is expected due to an amount of absorbed NOx in the catalyst 22 of the exhaust manifold 20 increased to or above a specified level (absorption excessive state), the air-fuel ratio in the combustion chamber 4 is controlled to be approximate to or smaller than a theoretical air-fuel ratio mainly by increasing the fuel injection amount as described in detail later, and a part of the fuel is preliminarily sprayed between an initial phase of the intake stroke and a middle phase of the compression stroke in addition to the primary injection as shown in FIG. 4D, thereby reducing the oxygen concentration in the exhaust gas and increasing a reducing agent concentration to sufficiently release NOx from the catalyst 22 and reduce and purify them (hereinafter, "NOx emission control").

In the fuel injection modes respectively shown in FIGS. 4A to 4D, an actual excitation time (valve-opening time) of the fuel injector 5 is determined not only by the fuel injection amount, but also by the pressure of the common rail 6 detected by the pressure sensor 6a.

In this embodiment, attention is paid to the fact that the completion timing of the third or final injection may be later than a point of time corresponding to 35° after the TDC of the compression stroke of the cylinder 2 if an attempt is made to split the primary injection as described above. In such a case, the injection completion timing is advanced by shortening the injection intermission interval At, decreasing the number of split injections or preliminarily spraying a part of the fuel after a middle phase of the compression stroke of the cylinder 2 as shown in FIG. 4E.

The state of combustion when the primary injection is split is described in detail. If the fuel is sprayed by the fuel injector 5 at a point of time near TDC of the compression stroke of the cylinder 2, the fuel sprayed through the injection bore of the fuel injector 5 is sprayed into the combustion chamber 4 while spreading in a conical form as a whole, and is split into fine oil particles by the friction with air (atomization of fuel). The fuel vaporates from the outer surfaces of the oil particles to produce a fuel steam (vaporization of fuel). At this time, since the air in the combustion chamber 4 is in a state having a considerably high pressure and a high viscosity, if a large amount of fuel is sprayed at once as shown in FIG. 4A, the succeeding fuel particles may be combined with those of the fuel previously sprayed, thereby hindering not only the atomization, but also the vaporization of the fuel.

On the contrary, if the fuel is split and sprayed a plurality of times as shown in FIGS. 4B and 4C, drops of fuel sprayed by opening the valve are less likely to come up with those previously sprayed by opening the valve of the fuel injector 5, thereby substantially preventing the atomization of the fuel from being hindered due to the recombination of the fuel drops. Further, the atomization of the fuel can be further promoted by increasing the injection pressure of the fuel. This enables the fuel to be more uniformly distributed in the combustion chamber and further improves an air utilization factor. A mixed state of the sprayed fuel and air by the split injections also changes depending on various parameters including the fuel injection amount, the injection timing, the injection rate, the pressure of the fuel, the number of split injections and the injection intermission interval and a mutual relationship of these parameters. It is considered that the state of combustion changes as a result of the above changes and the fuel consumption performance and the exhaust gas temperature of the engine 1 or the concentration of the gas components such as CO, HC, Nox of the exhaust gas change.

Specific experiments were conducted using a four-cylinder diesel engine (cubic capacity of about 2000 cc) similar to the one according to this embodiment. This engine was operated at relatively low engine load and low engine rotation speed. By suitably changing the injection intermission interval Δt of the fuel injector 5 in a range of 350 to 900 microseconds (μsec) in the respective cases of one-shot injection, two-split injection and three-split injection, resulting varying relationships between the crank angle at the injection completion timing and the CO concentration, NOx concentration, fuel consumption rate, exhaust gas temperature and exhaust gas pressure were measured. Exemplary results of the experiments are shown in FIGS. 5 to 9.

Figure 5:
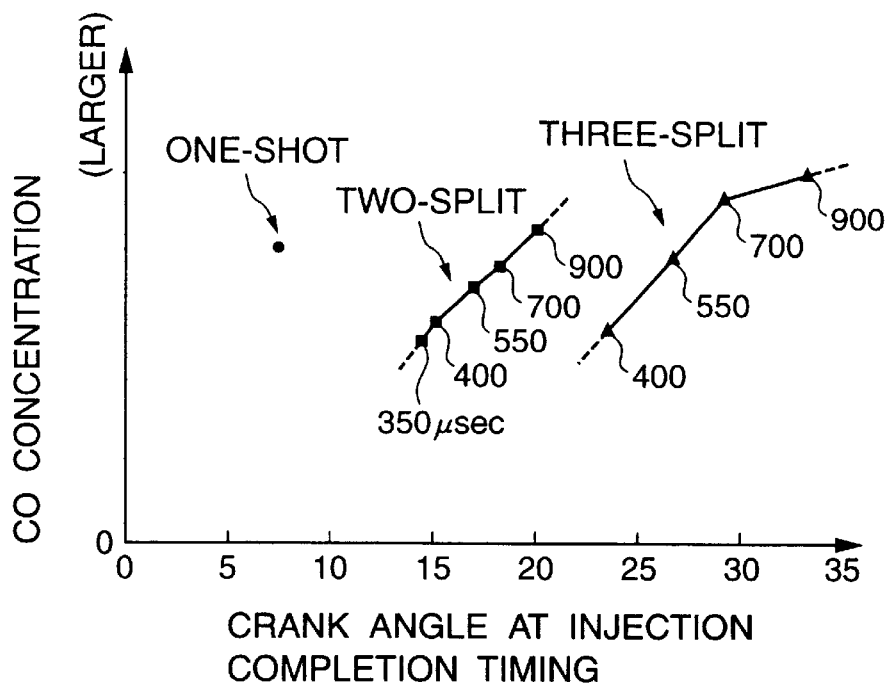
FIG. 5 is a graph showing a CO concentration characteristic in an exhaust gas when the number of fuel injections and an intermission interval between the split injections are changed, respectively.
Figure 6:
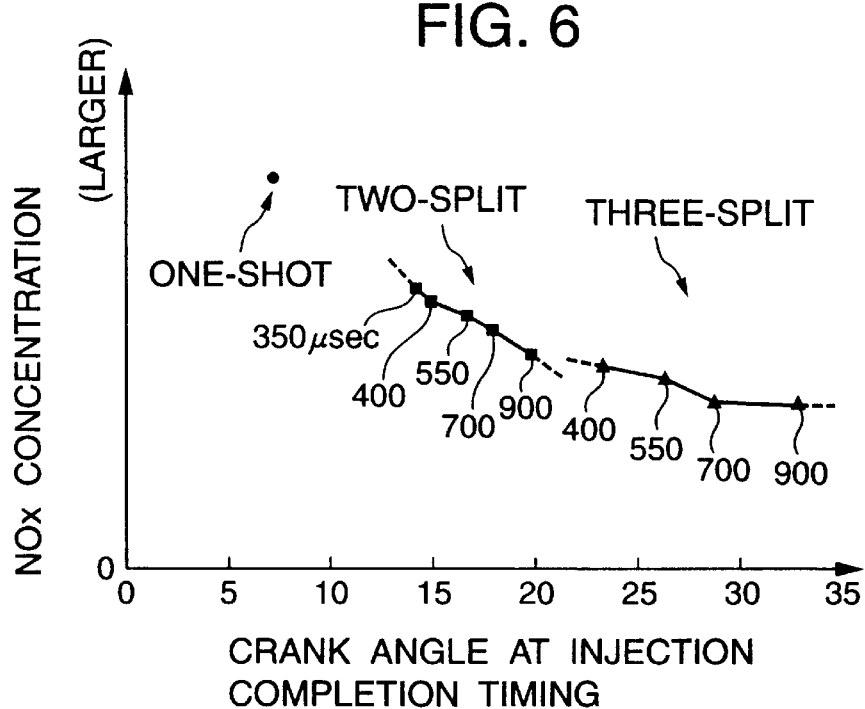
FIG. 6 is a graph similar to FIG. 5, showing a NOx concentration characteristic in the exhaust gas.

First, as shown in relation to the CO concentration in FIG. 5, values at Δt=350, 400, 550, 700, 900 μsec. are plotted for the two-split injection, and values at Δt=400, 550, 700, 900 μsec. are plotted for the three-split injection. According to FIG. 5, the CO concentration in the exhaust gas tends to decrease as the injection intermission interval Δt of the fuel injector 5 becomes shorter while tending to increase as the injection intermission interval Δt becomes longer, in both cases of the two-split injection and the three-split injection. Further, unlike the CO concentration, the NOx concentration in the exhaust gas decreases as the injection intermission interval Δt of the fuel injector 5 becomes longer as can be seen from FIG. 6. Though not shown, the HC concentration in the exhaust gas has the same or similar tendency as the CO concentration therein.

Figure 7:
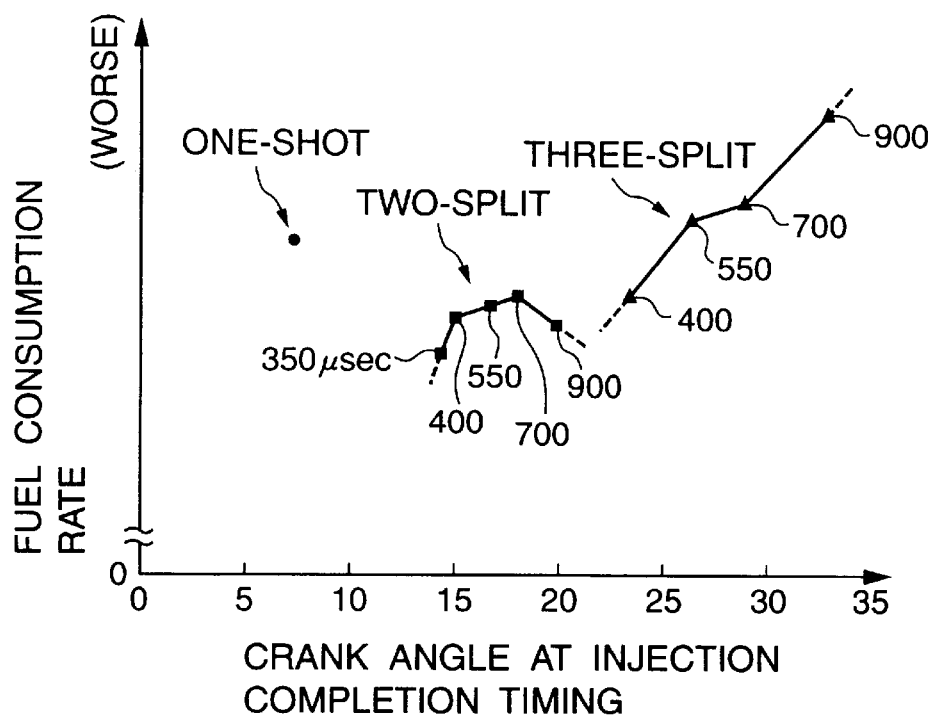
FIG. 7 is a graph similar to FIG. 5, showing a fuel consumption characteristic of the engine.
Figure 8:
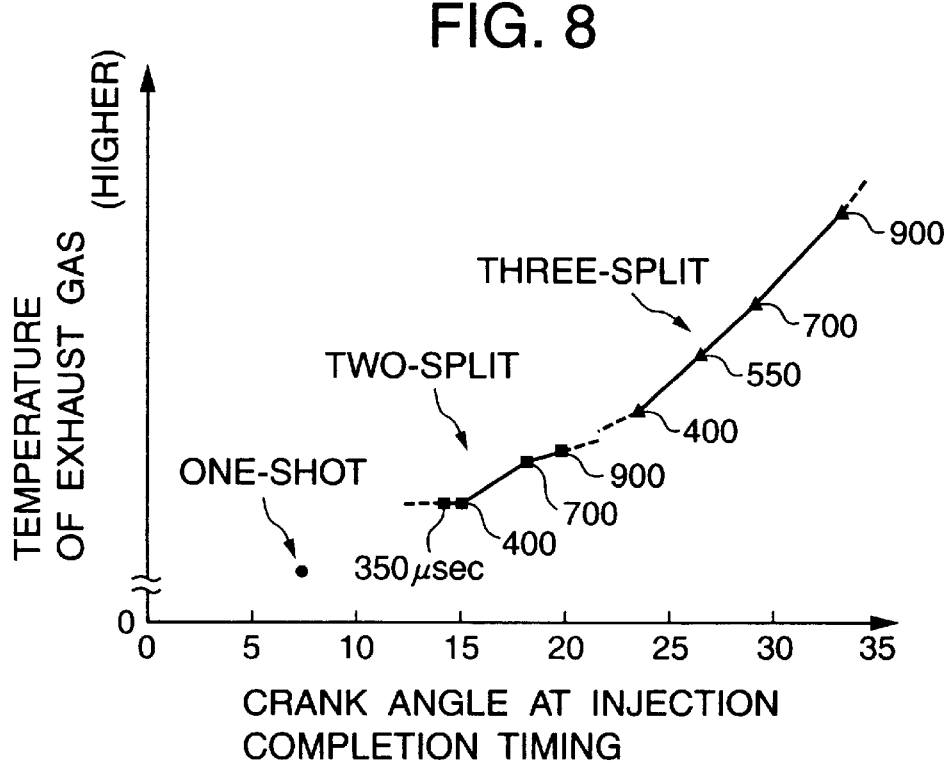
FIG. 8 is a graph similar to FIG. 5, showing an exhaust gas temperature characteristic.

The fuel consumption rate of the engine changed as shown in FIG. 7. The fuel consumption rate is better in the two-split injection than in the one-shot injection. On the other hand, the fuel consumption rate is slightly improved when the injection intermission interval Δt is short, however, it tends to get worse as the injection intermission interval Δt increases. In other words, an output torque of the engine is reduced if the number of split injections and the injection intermission interval Δt are increased without changing a total fuel injection amount. Further, the exhaust gas temperature changed as shown in FIG. 8. The exhaust gas temperature is higher in the two-split injection than in the one-short injection, and even higher in the three-split injection than in the two-split injection. Based on this fact, it can be thought that the temperature of the catalyst 22 is increased to promote refreshing of the catalyst 22 by, for example, performing a control to split the primary injection prior to the NOx emission control.

Figure 9:
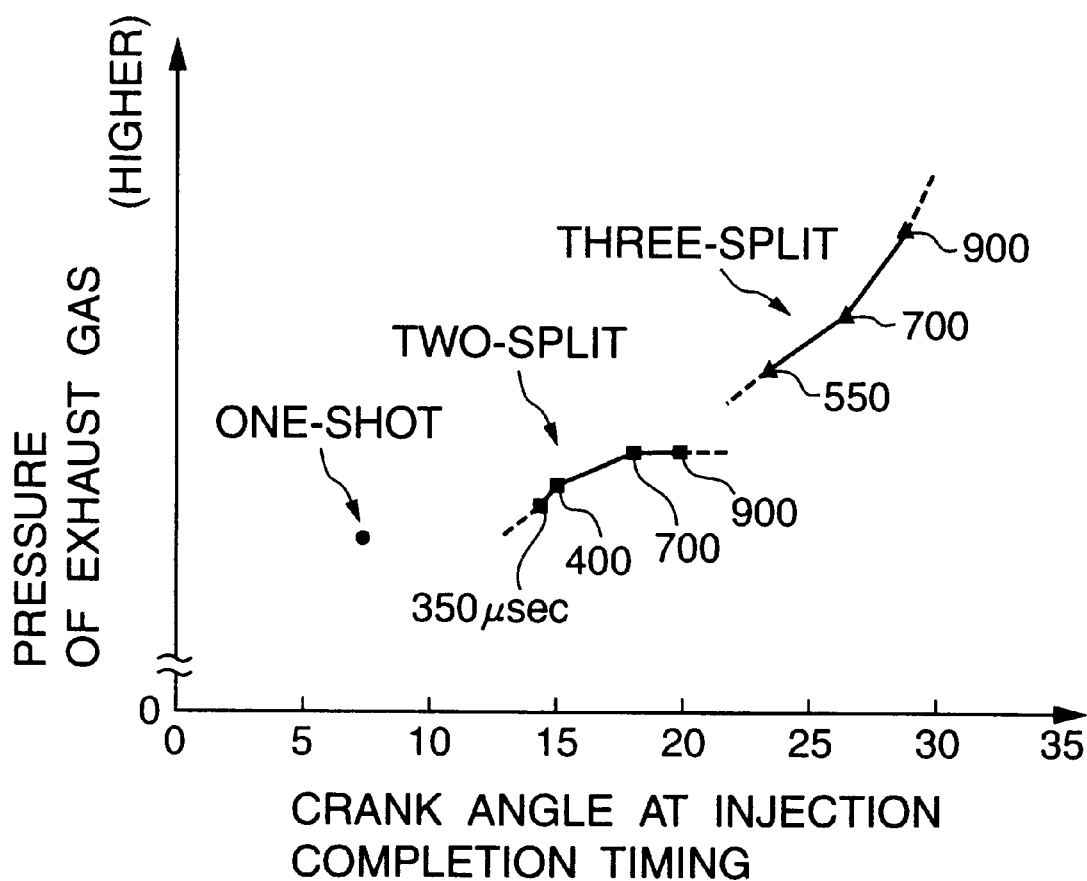
FIG. 9 is a graph similar to FIG. 5, showing an exhaust gas pressure characteristic.

The exhaust gas pressure changed as shown in FIG. 9. This graphs shows that the exhaust gas pressure is increased similar to the exhaust gas temperature by increasing the number of split injections and the injection intermission interval Δt. Accordingly, if the control is performed to split the primary injection (primary injection splitting control), for example, during the accelerated operating state of the engine, both the exhaust gas temperature and the exhaust gas pressure increase as can be seen from the above experiment results. Such an increase of the exhaust gas energy is thought to quickly increase a supercharging pressure of the turbosupercharger 25, thereby improving an acceleration performance.

Accordingly, in the fuel injection control according to this embodiment, if the catalyst 22 is not sufficiently warmed up when needing to be refreshed due to an excessive NOx absorbed state during the operation of the engine 1, the temperature of the catalyst 22 is quickly increased and the CO and HC concentrations in the exhaust gas are gradually increased by performing the primary injection splitting control. Subsequently, the fuel injection amount is increased for correction, thereby decreasing the $O_2$ concentration in the exhaust gas while sufficiently increasing the CO and HC concentrations. In this way, the refreshing of the catalyst 22 is maximally promoted. The primary injection splitting control is also performed during the accelerative operating condition of the engine 1 to quickly increase the supercharging pressure of the turbosupercharger 25 by increasing the exhaust gas energy, thereby providing an excellent acceleration feeling.

Hereinbelow, a specific procedure of the fuel injection control is described with reference to flowcharts shown in FIGS. 10 to 12. It should be noted that this control is performed in synchronism with a crank angle signal for each cylinder.

Figure 10:
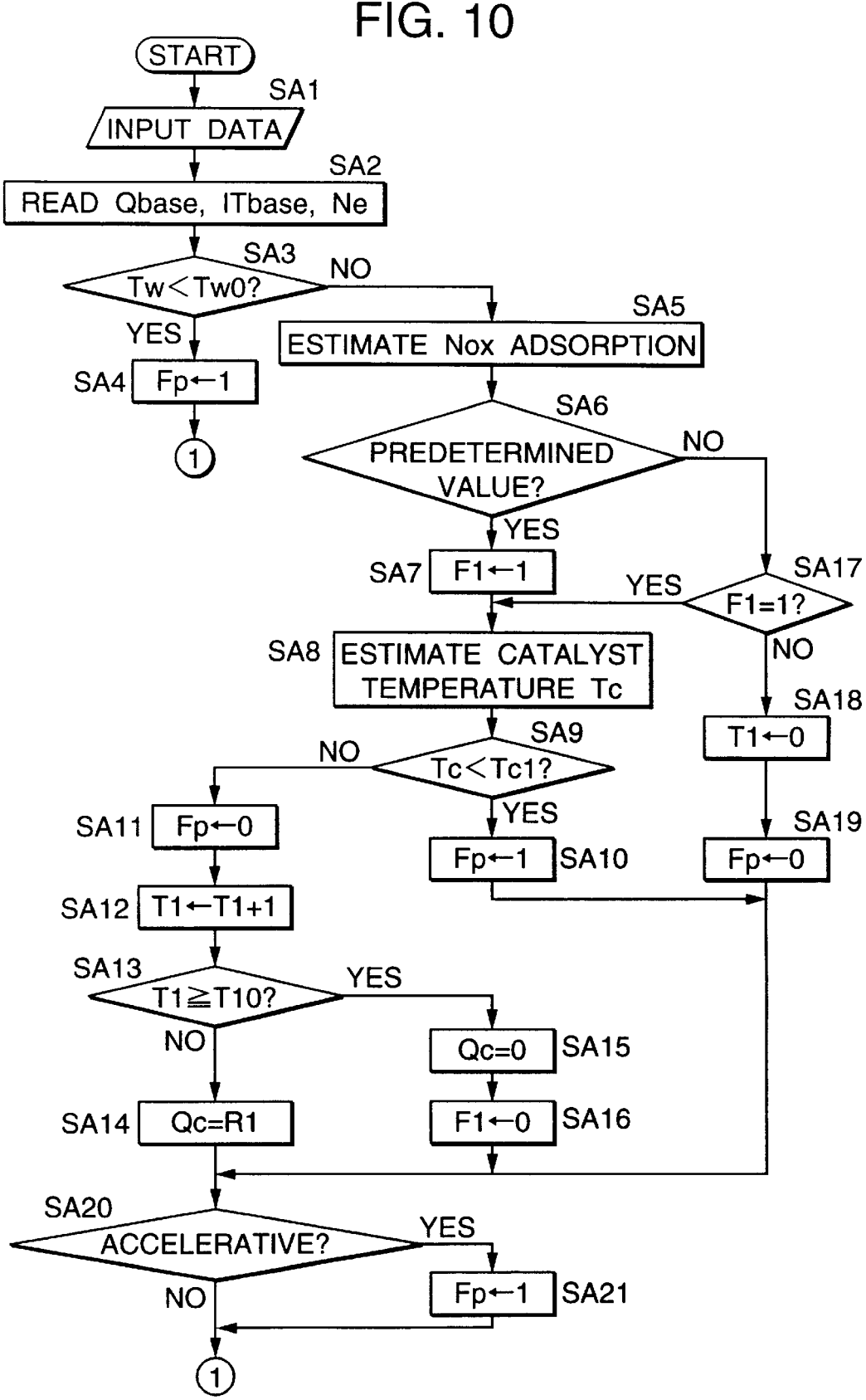
FIG. 10 is a flowchart showing a basic fuel injection amount setting procedure and a NOx emission control procedure in a fuel injection control.

First, in Step SA1 after the START of the flow shown in FIG. 10, data including the crank angle signal, the air flow sensor output, the $O_2$ sensor output, the travel of the acceleration pedal, the water temperature of the engine are inputted. In Step SA2, the basic fuel injection amount Qbase is read from the fuel injection amount map and an injection timing ITbase is read from a map defined in advance based on the target torque obtained from the travel of the acceleration pedal and the engine rotation speed Ne obtained from the crank angle signal. In the injection timing map are stored optimal injection timings corresponding to a water temperature Tw of the engine and the engine rotation speed Ne which were empirically obtained. For example, an ignition delay of the spray of fuel differs if the water temperature Tw of the engine and the engine rotation speed Ne differ. Thus, the basic injection timing ITbase is so set as to correspond to the water temperature Tw and the engine rotation speed Ne.

Subsequently, in Step SA3, it is judged whether the water temperature Tw is lower than a set water temperature Tw0. This set water temperature Tw0 is a water temperature corresponding to the state of the catalyst 22 not warmed up yet when the engine 1 is started while being cold. If the water temperature Tw is lower than the set water temperature Tw0 (YES in Step SA3), a flag Fp representing execution of the primary injection splitting control to promote the warming-up of the catalyst 22 is turned on (Fp=1) in Step SA4, followed by Step SB1 of FIG. 11. Specifically, if the catalyst 22 is not warmed up yet when the engine 1 is started while it is cold, the exhaust gas temperature is increased by executing the primary injection splitting control to increase the temperature of the catalyst 22. On the other hand, if Tw≧Tw0 (NO in Step SA3), Step SA5 follows upon judgment that the catalyst 22 is already warmed up.

In Step SA5, the NOx absorption amount by the catalyst 22 is estimated. This estimation is made, for example, based on a product of a running distance of the vehicle and a corresponding total fuel injection amount. Alternatively, the operating time of the engine 1 and the corresponding total fuel injection amount are multiplied, and the obtained product is corrected based on the operating condition of the engine 1. The NOx absorption amount may be estimated based on this corrected product. The estimated value of the NOx absorption amount is cleared after refreshing to be described later.

In Step SA6 following Step SA5, it is judged whether the estimated value of the NOx absorption amount is equal to or larger than a predetermined value. Step SA17 follows if the estimated value is smaller than the predetermined value, whereas Step SA7 follows unless otherwise. After a flag F1 representing a period for executing the NOx emission control is turned on in Step SA7, Step SA8 follows.

In Step SA8, the temperature of the catalyst 22 (catalyst temperature Tc) is estimated. This estimation may be made, for example, based on a history of the water temperature Tw of the engine during a specified period up to the present and the corresponding engine rotation speed, vehicle speed or the like. Alternatively, a temperature sensor may be provided in the exhaust manifold 20 near the catalyst 22, and the catalyst temperature Tc may be directly estimated based on an output of this temperature sensor. Subsequently, in Step SA9, it is judged whether the estimated catalyst temperature Tc is lower than a first predetermined temperature Tc1 where NOx removing performance is low (for example, 250° C.). If the judgment result is affirmative, it means that the catalyst 22 needs to be warmed up and the NOx absorption and emission action thereof are considerably reduced. Accordingly, this flow proceeds to Step SA20 after turning the flag Fp on (Fp=1) in Step SA10.

More specifically, even if the purifying performance of the catalyst 22 is thought to decrease due to a large NOx absorption amount, refreshing of the catalyst 22 cannot be sufficiently promoted by releasing the NOx if the catalyst 22 needs to be warmed up. Neither does the catalyst 22 sufficiently reduce nor purify the released NOx. Thus, in such a case, the temperature of the catalyst 22 is designed to increase by executing the primary injection splitting control as described later.

If the judgment result in Step SA9 is negative, the flag Fp is cleared in Step SA11. In following Step SA12, a first timer value T1 (initial value: 0) for measuring a lapse of time of the NOx emission control is incremented. Subsequently, in Step SA13, it is judged whether the first timer value T1 is equal to or larger than a predetermined value T10. This threshold value T10 corresponds to the period of the NOx emission control set in advance. Thus, if the judgment result in Step SA13 is negative, a fuel increase correction amount Qc (Qc=R1) used to increase the basic fuel injection amount Qbase for correction so that the air-fuel ratio in the combustion chamber 4 approximates substantially to the theoretical air-fuel ratio is determined in Step SA14. Then, this flow proceeds to Step SA20.

Specifically, the fuel increase correction amount Qc is determined by calculating such a fuel injection amount as to make the air-fuel ratio approximate substantially to the stoichimetric air-fuel ratio in relation to, for example, the intake air amount obtained from the output of the air flow sensor 11. On the other hand, if the judgment result in Step SA13 is affirmative, the fuel increase correction amount Qc is set at 0 (Qc=0) in Step SA15 since the period for the NOx emission control has already elapsed. This flow proceeds to Step SA20 after clearing the flag F1 (Fp=0) in Step SA16.

In other words, if the purifying performance of the catalyst 22 is thought to decrease due to the increased NOx absorption amount and the catalyst 22 needs to be warmed up, the catalyst 22 is refreshed by releasing the NOx from the catalyst 22 and reducing and purifying them by executing the NOx emission control.

In Step SA17 which follows upon judgment that the estimated value of the NOx absorption amount is smaller than the predetermined value in Step SA6, the state of the flag F1 is judged. If the flag F1 is on (F1=1) (YES in Step SA17), Step SA8 follows since the NOx emission control is being executed. On the other hand, if the flag F1 is off (F1=0) (NO in Step SA17), the first timer value T1 is reset (T1=0) in Step SA18 since it is not a period for the NOx emission control. This flow proceeds to Step SA20 after clearing the flag Fp (Fp=0) in Step SA19.

In Step SA20 following Step SA10, SA14, SA16 or SA19, it is judged whether the engine 1 is in the accelerative operating condition. If the accelerative operating condition of the engine 1 is judged based on changes in the travel of the acceleration pedal and the engine rotation speed, etc., the flag Fp is turned on (F=1) in Step SA21. Unless otherwise, Step SB1 of FIG. 11 follows with the state of the flag Fp left unchanged. In this way, in the accelerative operating condition of the engine 1, the exhaust gas pressure is increased by executing the primary injection splitting control regardless of the state of the catalyst 22 to thereby improve the supercharging effect of the turbosupercharger 25.

Figure 11:
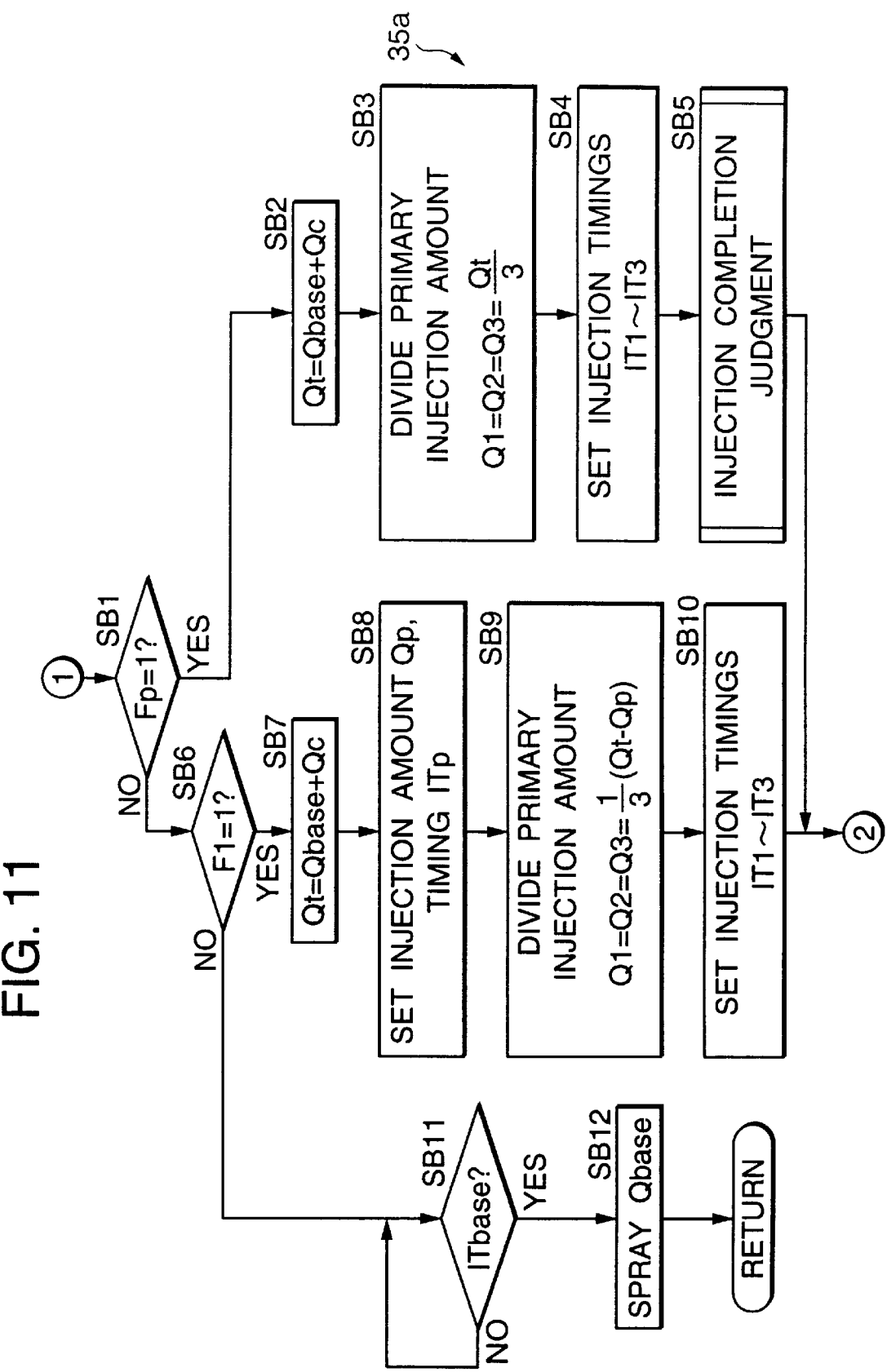
FIG. 11 is a flowchart showing an injection mode setting procedure in the fuel injection control.

In Step SB1 of FIG. 11 following Step SA4, SA20 or SA21, it is first judged whether the flag Fp is on. Step SB6 follows if the judgment result is negative, whereas Step SB2 follows if it is affirmative. In Step SB2, a total fuel injection amount Qt is calculated by adding the fuel increase correction amount Qc to the basic fuel injection amount Qbase. Unless the flag F1 is on, i.e. unless the catalyst 22 is in the excessive NOx absorbed state, Qc=0. Accordingly, Qt=Qbase. Subsequently, in Step SB3, the total fuel injection amount Qt is equally divided by three, thereby obtaining final first, second and third fuel injection amounts Q1, Q2, Q3.

Subsequently in Step SB4, first to third fuel injection timings IT1 to IT3 are set. Here, the first fuel injection timing IT1 is same as the basic fuel injection timing ITbase, and the second and third fuel injection timings IT2, IT3 are so set as to come after the lapse of a set interval Δt (injection intermission interval) following the closing of the fuel injector 5 upon completion of the previous injection. This set interval Δt is in a range of about 500 microseconds to about 1 millisecond. Values optimal in view of the fuel consumption performance and emission balance are empirically determined according to the operating condition of the engine 1 and stored in the form of a map. One optimal value is read from this map and set as the interval Δt. Δt=700 to 1000 microseconds, for example, during the accelerative operating condition of the engine 1.

Subsequently, a subroutine "Injection Completion Judgment" is executed in Step SB5. Though described in detail later, it is judged whether the completion timing of the third injection is later than the point of time corresponding to 35° after TDC of the compression stroke when the primary injection is to be split. If it is judged to be later, the injection intermission interval Δt between the respective split injections may be shortened or a preliminary injection amount Qp and a corresponding injection timing ITp are so set as to preliminarily spray a part of the fuel after the middle phase of the compression stroke of the cylinder 2 as shown in FIG. 4E. After the execution of the subroutine "Injection Completion Judgment", the fuel injection described later is performed in Steps SC1 to SC11 of FIG. 12.

Specifically, in this flow, the primary injection is split into three injections when any one of the following three conditions is met: (1) the catalyst 22 needs to be warmed up when the engine 1 is started while being cold; (2) the NOx emission control is to be executed during the operation of the engine 1 and the catalyst 22, which is not sufficiently warm, is warmed up before increasing the fuel injection amount for correction; and (3) the engine 1 is in the accelerative operating condition.

In Step SB6 following the judgment that the flag Fp is off in Step SB1, it is judged whether the flag F1 is on. Step SB11 follows if this judgment result is negative (F1=0), whereas Step SB7 follows if it is affirmative (F1=1). In Step SB7, the total fuel injection amount Qt is calculated by adding the fuel increase correction amount Qc to the basic fuel injection amount Qbase as in Step SB2. In other words, such a total fuel injection amount Qp as to make the average air-fuel ratio in the combustion chambers 4 of the engine 1 approximate substantially to the stoichiometric air-fuel ratio is calculated. Subsequently, in Step SB8, the injection amount Qp and the injection timing ITp of the preliminary injection are set. Specifically, optimal values of the preliminary fuel injection amount corresponding to the operating conditions of the engine 1 are stored in the form of a map, and one optimal value is read as Qp from this map. A ratio of the preliminary fuel injection to the primary fuel injection in the amount of fuel is set in a range of 8 to 23%.

The fuel injection amount Qp of the preliminary injection may be set at the fuel increase correction amount Qc. Then, the calculation for the control can be simplified. Further, the preliminary injection is preferably performed between the initial phase of the intake stroke of the cylinder 2 and the first half of the compression stroke of the cylinder 2 as shown in FIG. 4D. In this embodiment, the injection timing ITp of the preliminary injection is set at a point of time during the first half of the intake stroke of the cylinder 2.

Subsequently, in Step SB9, a remainder of the total fuel injection amount Qt minus the preliminary fuel injection amount Qp is equally divided by 3 and set at the final first, second and third fuel injection amounts Q1, Q2 and Q3. In following Step SB10, the injection timings IT1 to IT3 of the first to third fuel injection amounts Q1 to Q3 are set as in Step SB4. In this case as well, the first injection timing IT1 is the same as the basic fuel injection timing ITbase, and the second and third fuel injection timings IT2, IT3 are so set as to come after the lapse of the set interval Δt following the closing of the fuel injector 5 upon completion of the previous injection. The intermission interval Δt is also set at a value within a range of about 500 microseconds to about 1 millisecond, and is read from a map similar to the one used in Step SB4. Then, this flow proceeds to Steps SC1 to SC11 of FIG. 12 to spray the fuel as described later.

Specifically, if the flag F1 is on (F1=1), i.e. the catalyst 22 is warmed up and in the excessively NOx absorbed condition, the fuel injection amount is increased for correction so that the air-fuel ratio in the combustion chamber 4 of the engine 1 is approximate to or larger than the stoichiometric air-fuel ratio, and a part of the fuel increased in amount is preliminarily sprayed in the first half of the intake stroke of the cylinder 2 while the respective thirds of the remaining fuel are sprayed at three different timings near TDC of the compression stroke of the cylinder 2. Since the preliminary injection is performed as described above, the primary injection completion timing cannot be later than a point of time corresponding to 35° after TDC of the compression stroke. Therefore, the injection completion judgment as in Step SB5 is not necessary in this case.

In Step SB11 following the judgment result of Step SB6 that the flag F1 is off, it is judged whether the basic injection timing ITbase has come based on the crank angle signal. This flow waits until the injection timing ITbase comes (No in Step SB11) while proceeding to Step SB12 if it has come (YES in Step SB11). In Step SB12, the fuel of the basic fuel injection amount Qbase is sprayed into the combustion chamber 5 all at once by the fuel injector 5 and this flow returns. In other words, since the fuel is sprayed all at once if the engine is in the usual operating condition, reliability can be improved by relatively reducing the number of opening and closing operations of the fuel injector 5.

Figure 12:
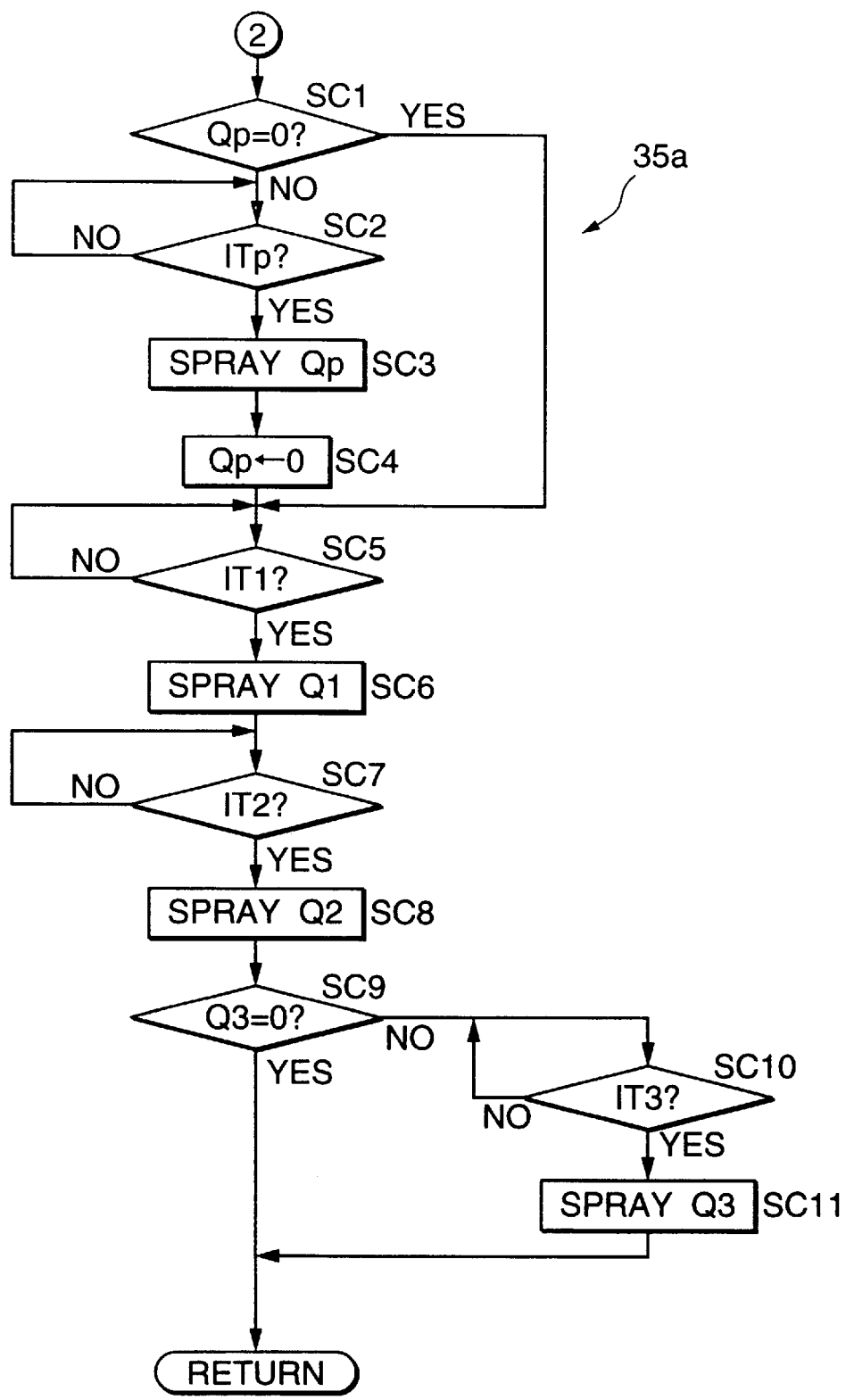
FIG. 12 is a flowchart showing an injector actuation control procedure in the fuel injection control.

In Step SC1 of FIG. 12 following Steps SB5, SB10 of FIG. 11, it is judged whether the value of the preliminary fuel injection amount Qp is equal to 0. This flow proceeds to Step SC5 if Qp=0 (YES in Step SC1) while proceeding to Step SC2 if Qp≠0 (NO in Step SC1). In Step SC2, it is judged whether the preliminary injection timing ITp has come based on the crank angle signal. This flow waits until the injection timing ITp comes (No in Step SC2) while proceeding to Step SC3 if it has come (YES in Step SC2). In Step SC3, the preliminary injection is performed to spray the fuel of the injection amount Qp into the combustion chamber 4 by the fuel injector 5. Step SC5 follows after the preliminary injection amount Qp is reset to 0 (Qp←0) in Step SC4.

In Step SC5, it is judged whether the first injection timing IT1 has come based on the crank angle signal. This flow waits until the injection timing IT1 comes (No in Step SC5) while proceeding to Step SC6 if it has come (YES in Step SC5). In Step SC6, the first primary injection is performed to spray the fuel of the injection amount Q1 into the combustion chamber 4 by the fuel injector 5. In following SC7, it is judged whether the second injection timing IT2 has come based on the crank angle signal. This flow waits until the injection timing IT2 comes (No in Step SC7) while proceeding to Step SC8 if it has come (YES in Step SC7). In Step SC8, the second primary injection is performed.

Subsequently in Step SC9, it is judged whether the value of the third fuel injection amount Q3 is equal to 0. This flow returns if Q3=0 (YES in Step SC9) while proceeding to Step SC10 if Q3≠0 (NO in Step SC9). In Step SC10, it is then judged whether the third injection timing IT3 has come based on the crank angle signal. This flow waits until the injection timing IT3 comes (No in Step SC10) while proceeding to Step SC11 if it has come (YES in Step SC10). This flow returns after the third primary injection is performed in Step SC11.

Steps SB3, SB4, SB9, SB10 of the flow shown in FIG. 11 and the respective Steps of the flow shown in FIG. 12 construct a split injection controller 35a for performing the three-split primary fuel injection at a point of time near TDC of the compression stroke of the cylinder by the fuel injector 5 such that the succeeding split injection is performed after the injection intermission interval Δt following the closing of the fuel injector 5.

By the fuel injection control as described above, if the engine 1 is in the usual operating condition, the basic fuel injection amount Qbase is sprayed all at once from the fuel injector 5 at a point of time near TDC of the compression stroke of each cylinder 5 as shown in FIG. 4A. NOx produced as a result of combustion are absorbed by the catalyst 22. If the amount of the absorbed NOX is excessive, the NOx emission control is executed to release NOx from the catalyst 22 and reduce and purify them.

At this time, if the catalyst 22 is in a low-temperature state corresponding to a state where it needs to be warmed up, for example, because the engine 1 is held in a specified low operating condition for a long time, the primary injection splitting control is first executed to spray the fuel three times by the fuel injector 5 at a point of time near TDC of the compression stroke of each cylinder. By splitting the primary injection, a mixed state of the sprayed fuel and air is significantly improved, a heat producing rate by combustion is increased due to an improved air utilization factor, and the completion timing of the combustion is retarded. As a result, the exhaust gas temperature is increased as shown in FIG. 8, thereby enabling the temperature of the catalyst 22 provided in the exhaust manifold 20 to be quickly increased.

The NOx emission control is executed after the catalyst 22 is warmed up by quickly increasing the temperature thereof, and the fuel injection amount from the fuel injector 5 is increased for correction so that the average air-fuel ratio in the combustion chambers approximates substantially to the stoichimetric air-fuel ratio. This reduces an $O_2$ concentration in the exhaust gas and sufficiently increases the concentrations of reducing agents such as CO and HC. Thus, NOx can be quickly released from the warmed catalyst 22 and sufficiently reduced and purified. Further, since a part of the fuel is preliminarily sprayed in the first half of the intake stroke of each cylinder 2 at this time, the spray of the fuel will not become excessively concentrated even if the fuel injection amount is increased, thereby restraining a sharp increase in generation of smoke. In other words, the catalyst 22 can be very efficiently refreshed by increasing the temperature of the catalyst 22 prior to the correction to increase the fuel injection amount during the NOx emission control.

In the fuel injection control according to this embodiment, the primary injection splitting control is similarly executed during the accelerative operating condition of the engine 1 to quickly increase the supercharging pressure of the turbo-supercharger 25 by increasing the exhaust gas energy as shown in FIGS. 8 and 9. As a result, the acceleration performance of the engine 1 can be improved.

(Injection Completion Judgment)

Next, a specific procedure of the subroutine "Injection Completion Judgment" executed in Step SB5 of the flow shown in FIG. 11, which is a feature of the present invention, is described with reference to FIGS. 13 to 17.

Figure 13:
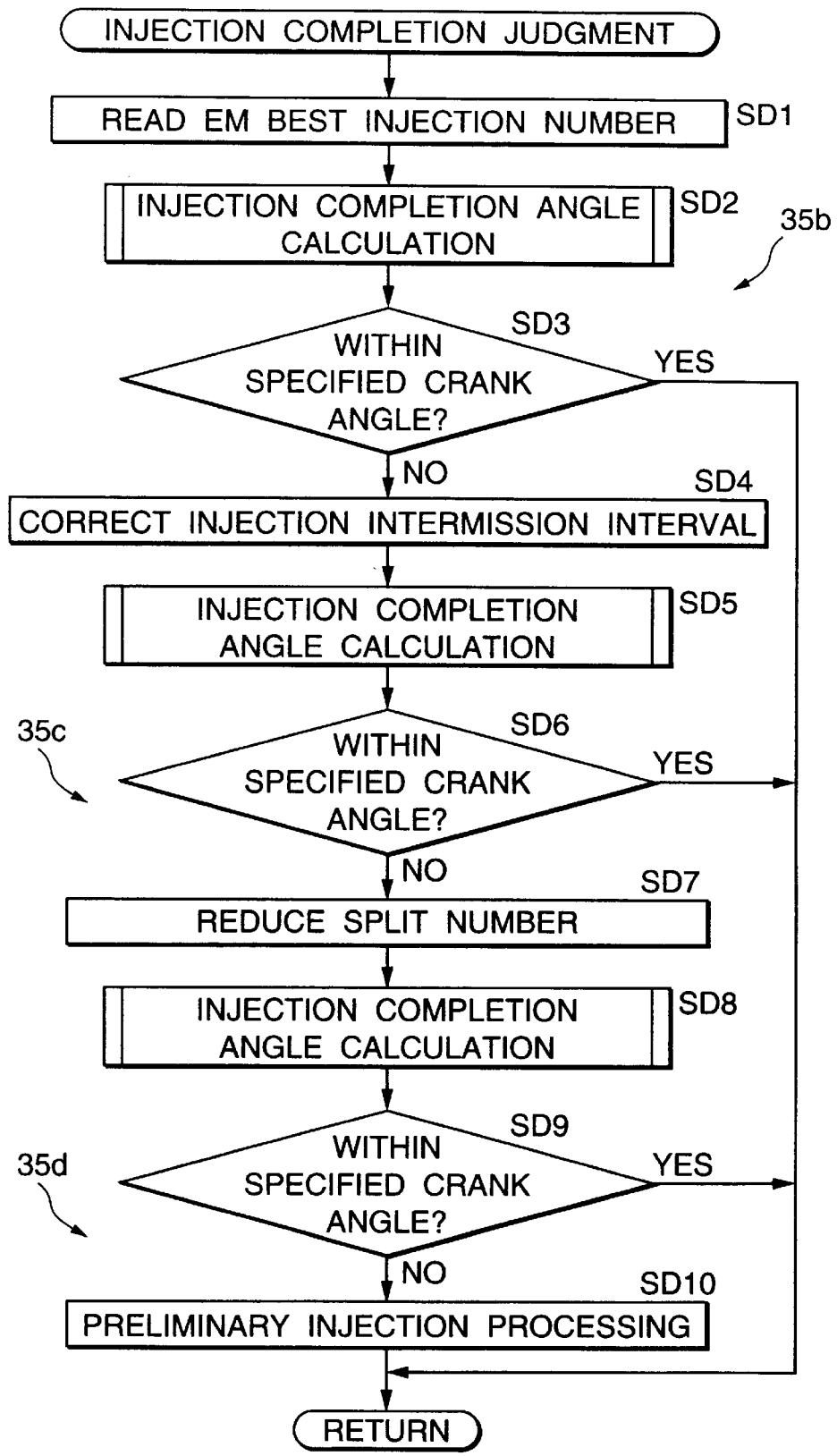
FIG. 13 is a flowchart showing a subroutine "Injection Completion Judgment"

First, in Step SD1 of a flow shown in FIG. 13, the number of the split primary injections (EM best injection number) which provides a best emission performance of the engine 1 according to the operating condition of the engine 1, i.e. according to the engine rotation speed and the target torque is read from a map storing corresponding values. In this embodiment, the number of split injections (hereinafter, "split number") is set at 3 as shown in Step SB3 of the flow of FIG. 11. Subsequently in Step SD2, the crank angle where the primary injection is completed, i.e. an injection completion angle (injection completion timing) is calculated based on the fuel injection amount of the engine 1, the engine rotation speed, the common rail pressure and other parameters in addition to the split number and the injection intermission interval Δt.

Figure 14:
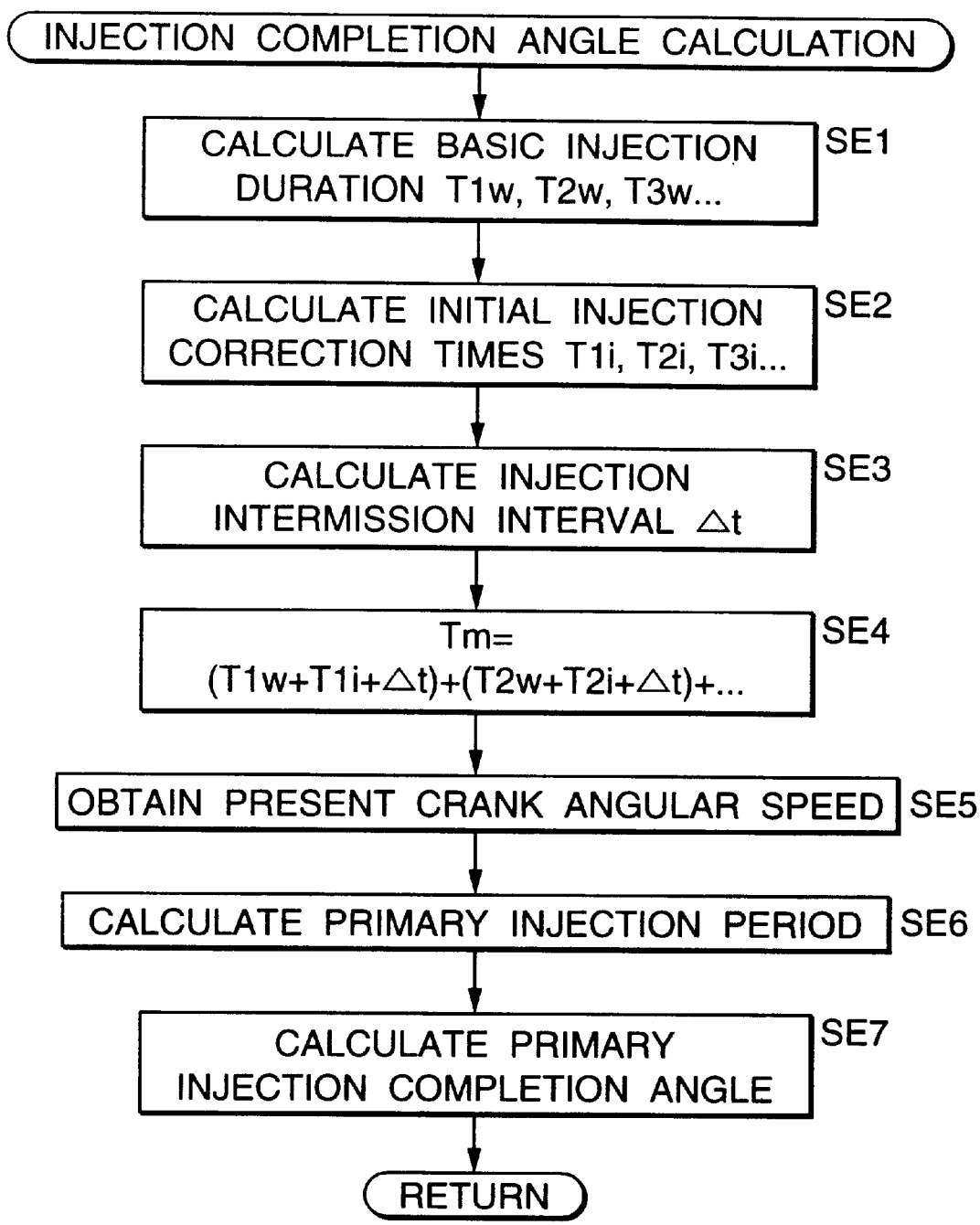
FIG. 14 is a flowchart showing a subroutine "Primary Injection Completion Calculation"

Here, the injection completion angle is calculated by a procedure shown in FIG. 14. In Step SE1, the fuel injection amount is equally split by 3, and valve opening times (basic injection durations) T1$w$, T2$w$ and T3$w$ of the fuel injector 5 in the respective injection conditions are calculated based on the common rail pressure (fuel injection pressure). Subsequently, initial injection correction times T1$i$, T2$i$, T3$i$ corresponding to delays of the operation of the fuel injector 5 are calculated in Step SE2, the injection intermission interval Δt is read in Step SE3, and a total time Tm required for the primary injection is calculated by adding basic injection times T1$w$, T2$w$, T3$w$, the initial injection correction times T1$i$, T2$i$, T3$i$ and twice the injection intermission interval Δt. The injection intermission interval Δt is added twice since the one following the last split injection is not added.

Subsequently in Step SE5, the present crank angular speed obtained from a signal from the crank angle sensor 9, i.e. the rotating speed of the engine 1 (engine rotation speed) is read. Simultaneously, a change in this angular speed is detected to estimate the crank angular speed when the fuel injector 5 is actually operated. Specifically, since the crank angular speed changes due to a slight displacement in a timing of the primary injection completion calculation and an operating timing of the fuel injector 5, for example, during a sharply accelerative operating condition of the engine 1, the crank angular speed used for the calculation is corrected to enhance the calculation precision of the crank angle where the primary injection is completed. A primary injection period (angle) is obtained by multiplying the primary injection time Tm by the crank angular speed in Step SE6, a primary injection completion angle is calculated by adding the primary injection period (angle) to the primary injection starting angle corresponding to the first injection timing IT1 of the primary injection, and this subroutine returns.

Since the injection completion timing is judged based on the fuel injection amount during the primary injection, the crank angular speed (engine rotation speed) and the common rail pressure in this way, the judgment can be very precisely made.

Subsequently, in Step SD3 of FIG. 13, it is judged whether the injection completion angle is within a specified crank angle. This subroutine returns if the judgment result is affirmative while proceeding to Step SD4 if it is negative, i.e. the completion timing of the primary injection is later than the point of time corresponding to the specified crank angle. In Step SD4, the injection intermission interval Δt between the respective split injections is reduced for correction. The injection completion angle is calculated again as in Step SD2 based on the corrected injection intermission interval Δt in Step SD5. In Step SD6 of FIG. 13, it is judged whether the injection completion angle is within the specified crank angle. This subroutine returns if the judgment result is affirmative while proceeding to Step SD7 if it is negative, i.e. the completion timing of the primary injection is later than the point of time corresponding to the specified crank angle.

In Step SD7, the split number is reduced. More specifically, the split number is reduced from 3 to 2, and a valve-opening period of the fuel injector 5 to spray half the amount of fuel sprayed during this primary injection is calculated. In this case, the total fuel injection amount is different, i.e. is so corrected as to obtain the same output torque as the one obtained when the three-split injection is performed. Subsequently in Step SD8, the injection completion angle for the case of two-split injection is calculated as in Steps SD2 and SD5. It is then judged in Step SD9 whether the injection completion angle is within the specified crank angle. Here, the specified crank angle is such a retarded crank angle that the fuel sprayed from the injection bore of the fuel injector 5 at a point of time later than the crank angle can be continuously burnt together with the previously sprayed fuel. In this embodiment, the specified crank angle is set at about 35° after TDC of the compression stroke.

Specifically, if the injection completion timing is judged to be later than the point of time corresponding to 35° after TDC of the compression stroke, for example, as shown in FIG. 15A, the judgment is made again after reducing the injection intermission interval Δt for correction. If the injection completion timing is still judged to be later than the point of time corresponding to 35° after TDC of the compression stroke as shown in FIG. 15B, then the split number is reduced. This subroutine returns if the above judgment result is affirmative, i.e. the injection completion angle is earlier than 35° after TDC of the compression stroke as shown in FIG. 15C.

Contrary to this, in the case that the fuel injection amount has to be sharply increased despite a low common rail pressure because the engine 1 is put in a sharp accelerative operating condition such as when a vehicle is started, the valve opening period of the fuel injector 5 is fairly long. As a result, the completion angle of the primary injection may be considerably delayed as shown in FIG. 16A. In such a case, even if the injection intermission interval Δt is reduced for correction or the split number is reduced as described above, the injection completion angle cannot be sufficiently advanced as shown in FIGS. 16B and 16C. Thus, there is a likelihood that the state of combustion may be significantly deteriorated. In order to avoid such an event, a preliminary injection processing is performed in step SD10 if the judgment result in Step SD9 is negative.

Specifically, in Step SD10, the fuel injection amount during the primary injection is reduced for correction such that the injection completion angle is 35° after TDC of the compression stroke, and a processing is performed to preliminarily spray the fuel during the compression stroke of the cylinder in such a manner as to correspond to such a correction. In other words, the fuel injection amount Qp of the preliminary injection is so set as to compensate for a fall in engine output resulting from the reductive correction of the fuel amount sprayed during the primary injection, and the preliminary injection timing ITp is set at a point of time during the second half of the compression stroke (e.g. later than 90° before TDC of the compression stroke and before the start of the primary injection), and is set earlier as the preliminary fuel Qp increases.

Figure 17A:
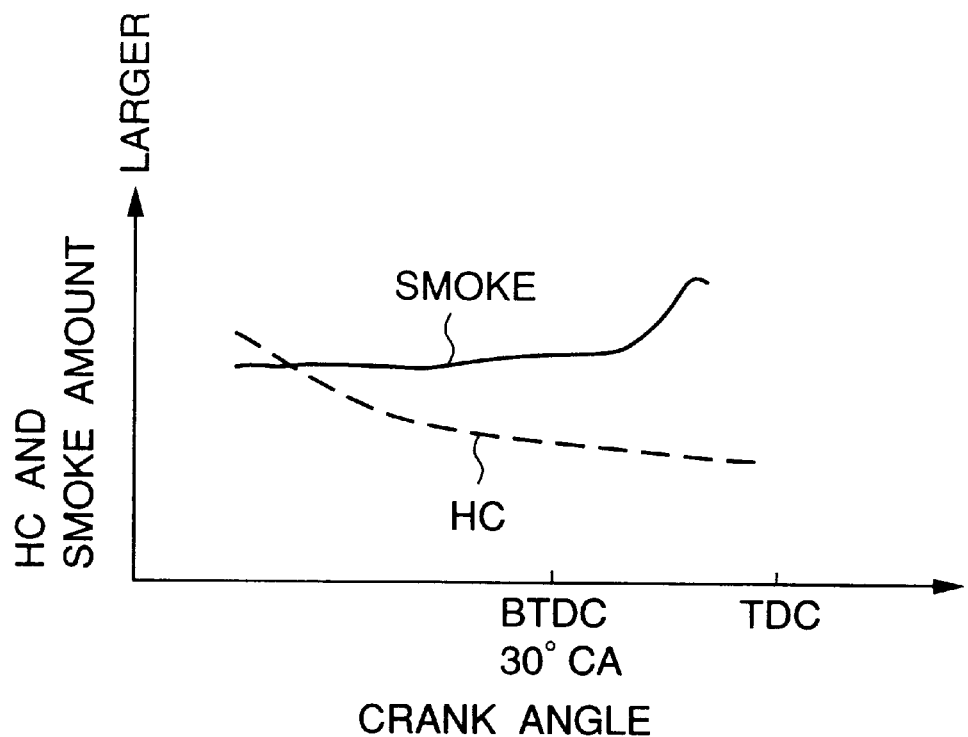
FIGS. 17A and 17B are graphs showing an exhaust tendency of exhaust toxic components when an injection timing is changed in the case that the preliminary injection is performed at a latter half of a compression stroke of the cylinder and in the case that an additional fuel is sprayed during an expansion stroke of the cylinder, respectively.

However, generation of smoke may sharply increase depending upon the operating condition of the engine 1 if the preliminary injection is performed later than at the point of time corresponding to 30° before TDC of the compression stroke as shown in FIG. 17A. On the other hand, if the preliminary injection timing is too early, a discharge amount of unburnt HC gradually increases as the injection timing advances due to adhesion of fuel to the wall surface. The preliminary injection timing is preferably set at 90 to 30° before TDC of the compression stroke in order to avoid such a deterioration of emissions.

Figure 17B:
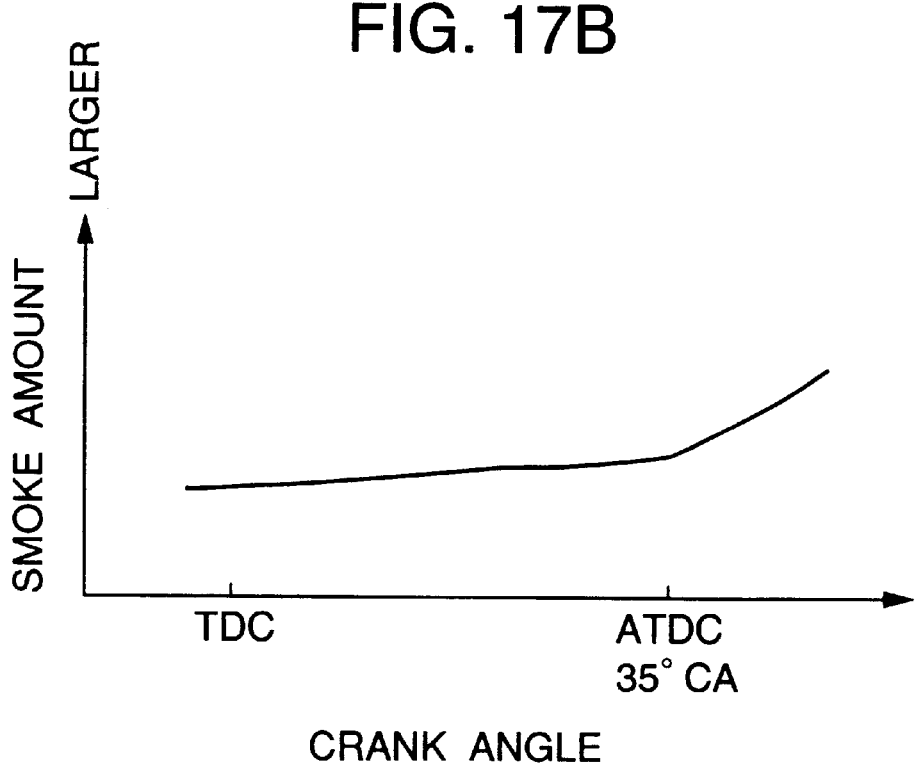

In response to the reductive correction of the fuel sprayed during the primary injection, it may be considered to spray a larger amount of fuel later than the expansion stroke of the cylinder. However, it is not preferable since there is a tendency to generate more smoke due to an incomplete combustion of fuel if fuel is sprayed later than the point of time corresponding to 35° after TDC of the compression stroke after the primary injection as shown in FIG. 17B.

Steps SD2, SD3, SD5, SD6, SD8 and SD9 of the flow shown in FIG. 13 construct a judger 35b for judging that the injection completion timing is later than the point of time corresponding to the specified crank angle (35° after TDC of the compression stroke). This judger 35b makes the above judgment at least based on the total fuel injection amount Qt of the primary injection, the engine rotation speed and the common rail pressure.

Steps SD4 and SD7 construct a corrector 35c for correcting the split number of the injection intermission interval Δt of the primary injection so as to advance the injection completion timing when the judger 35b judges that the primary injection completion timing is later than the point of time corresponding to the specified crank angle. Further, Step SD10 constructs the corrector 35c and an auxiliary injection controller 35d for causing the preliminary injection to be performed.

Thus, in the fuel injection control system A for a diesel engine according to this embodiment, the fuel to be sprayed during the primary injection at a point of time near TDC of the compression stroke of the cylinder is split and sprayed at three coordinated different timings by the split injection controller 35a. If the primary injection completion timing is judged to be later than the point of time corresponding to 35° after TDC of the compression stroke, the injection intermission interval Δt and/or the split number of the primary injection are reduced by the corrector 35c to advance the injection completion timing. If such corrections are not sufficient yet, the fuel injection amount of the primary injection is reduced for correction to advance the injection completion timing earlier than the point of time corresponding to 35° after TDC of the compression stroke. This hinders deterioration of the burnt state of the fuel sprayed at a final phase of the primary injection, thereby preventing deterioration of fuel consumption and an increase of incompletely combusted gases. A change of an output torque resulting from a change of the injection mode can be avoided by performing the preliminary injection by the auxiliary injection controller 35d so as to respond to the reductive correction of the fuel injection amount.

Since the primary injection splitting control is executed if necessary even if the preliminary injection is performed, fuel consumption and emissions can be reduced by an improved combustion by virtue of the split injections, and a turbosupercharging pressure can be quickly increased by increasing the exhaust gas energy if the engine 1 is in the accelerative operating condition, thereby improving an acceleration performance. In other words, if the primary injection is split into three split injections while the engine 1 is in the accelerative operating condition, more fuel needs to be sprayed and the primary injection completion timing tends to delay with respect to the crank angle during the accelerative operating condition. Accordingly, the action and effects of the correction to advance the injection completion timing as described above are particularly effective in such a case.

(Other Embodiments)

The present invention embraces various other embodiments without being restricted to the foregoing embodiment. Specifically, although the fuel to be sprayed during the primary injection is split into three parts and sprayed at three coordinated different timings by the primary injection splitting control in the foregoing embodiment, the split number may be any one of 2 to 7.

Further in the foregoing embodiment, the fuel is sprayed all at once during the primary injection when the engine 1 is in the usual operating condition. However, the present invention is not restricted thereto. The primary injection may be basically split into two or more parts, and the injection intermission interval Δt may be set in a range of 100 microseconds to 1 millisecond. For instance, if the primary injection is split into two parts, fuel consumption rate can be improved as a whole as shown in FIG. 7. In such a case, the exhaust gas energy can be increased by increasing at least one of the split number of the primary injection and the injection intermission interval Δt during the accelerative operating condition of the engine 1.

Although the primary injection completion timing is judged based on the fuel injection amount, the engine rotation speed and the common rail pressure in this embodiment, the present invention is not restricted thereto. For instance, if the engine 1 is in the accelerative operating condition and a rate of acceleration is larger than a predetermined value, the primary injection completion timing may be judged to be later than the point of time corresponding to 35° after TDC of the compression stroke. In other words, in such a sharp accelerative operating condition, the engine is generally in a low operating condition, and the fuel injection amount has to be sharply increased despite a low fuel injection pressure. Accordingly, as a result of elongated valve opening period of the fuel injector 5, it can be judged that the injection completion timing is later than the point of time corresponding to the specified crank angle. Therefore, the injection completion timing can be easily judged by a simple construction.

Further, although the split number and the injection intermission interval of the primary injection are shortened to advance the primary injection completion timing in the foregoing embodiment, the present invention is not restricted thereto. In order to advance the injection completion timing, the valve opening period of the fuel injector 5 may be relatively shortened by forcibly increasing the common rail pressure during the injection to increase a fuel injection pressure.

In the foregoing embodiment, moreover, it is judged based on the detection and the calculation whether a completion timing of the final split injection of the set primary injection is later than a point of time corresponding to a specified crank angle, and the fuel injection mode correction is performed based on the judgment. However, it may be appreciated to store corrected fuel injection modes for advancing the injection completion timing for the case of the completion timing being later than a point of time corresponding to a specified crank angle, for example, in a map storing the engine rotational speed and the target load in advance.

As described above, an inventive fuel injection control system for a diesel engine which has fuel injectors for directly spraying fuel into combustion chambers in cylinders of the engine, each fuel injector being controlled to spray the fuel at latest at a point of time near top dead center of a compression stroke of the corresponding cylinder. This control system comprises a split injection controller for splitting a primary injection of the fuel by each fuel injector near top dead center of the compression stroke of the cylinder into a plurality of split injections, one split injection being followed by the next split injection after an injection intermission interval which is a period lasting until the fuel injector is opened next following closing thereof; a judger for judging that a completion timing of the final split injection of the primary injection is later than a point of time corresponding to a specified crank angle; and a corrector for correcting at least one of the number of split injections performed as the primary injection, the injection intermission interval and a fuel injection pressure so as to advance the injection completion timing when the judger judges that the primary injection completion timing is later than the point of time corresponding to the specified crank angle.

With this construction, when the primary injection of the fuel at a point of time near top dead center of the compression stroke of each cylinder is split into a plurality of split injections by the split injection controller while the engine is operated, the corrector corrects at least one of the number of split injections performed as the primary injection, the injection intermission interval and the fuel injection pressure so as to advance the injection completion timing if the judger judges that the completion timing of the final split injection of the primary injection is later than the point of time corresponding to the specified crank angle. Thus, the injection of fuel at a point of time near top dead center of the compression stroke of each cylinder can be completed at a proper timing, with the result that deterioration of fuel consumption and an increase of incompletely burnt gases can be prevented.

Preferably, the judger may be made to judge the injection completion timing based on an amount of fuel to be sprayed during the primary injection and an engine rotation speed. In other words, the opening period of the fuel injector is substantially proportional to the amount of fuel to be sprayed. If the opening period of the fuel injector is same, the more injection completion timing is retarded, the higher the engine rotation speed. Therefore, the injection completion timing can be precisely judged based on the amount of fuel to be sprayed and the engine rotation speed.

Preferably, a pressurized chamber may be provided for storing the fuel in a state of a high pressure equal to or exceeding the fuel injection pressure, and the judger makes a judgment on the injection completion timing based on a pressure of the fuel in the pressurized chamber. If the amount of fuel to be sprayed is same, the higher the pressure of the fuel in the pressurized chamber, the longer the opening period of the fuel injector. Thus, the injection completion timing can be more precisely judged based on the pressure of the fuel.

Preferably, the specified crank angle for judging the injection completion timing may be made to be such a most retarded crank angle that the fuel sprayed up to a point of time corresponding to this crank angle can continue to be burnt with the previously sprayed fuel. If the primary injection completion timing is later than the point of time corresponding to the specified crank angle, the combustion of the fuel sprayed after the point of time corresponding to this crank angle is considerably deteriorated. Therefore, the advancement of the primary injection completion timing is very effective.

Preferably, the judger may be made to judge that the completion timing of the primary injection is later than the point of time corresponding to the specified crank angle when the engine is in an accelerative operating condition and a rate of acceleration is larger than a predetermined value. Specifically, in such an accelerative operating condition, the engine rotation speed is generally low, and the amount of fuel to be sprayed has to be sharply increased despite a low fuel injection pressure. This leads to a longer opening period of the fuel injector, with the result that it can be judged that the injection completion timing is later than the point of time corresponding to the specified crank angle. Therefore, the injection completion timing can be easily judged by a simple construction.

Preferably, a turbosupercharger may be further provided for supercharging an intake air by an exhaust gas of the engine, and the split injection controller splits the primary injection into a larger number of split injections when the engine is in the accelerative operating condition than when it is in a usual operating condition. At this time, the injection intermission interval can be shortened.

Thus, when the engine is in the accelerative operating condition, the split injection controller splitting the primary injection into a larger number of split injections to increase an exhaust gas temperature and an exhaust gas pressure, thereby sharply increasing a supercharging pressure of the turbosupercharger and, therefore, improving an acceleration performance. On the other hand, since the primary injection completion timing is delayed to a larger degree with such a control, the correction to advance the injection completion timing is particularly effective.

Also, an inventive fuel injection control system for a diesel engine which has fuel injectors for directly spraying fuel into combustion chambers in cylinders of the engine, each fuel injector being controlled to spray the fuel at latest at a point of time near top dead center of a compression stroke of the corresponding cylinder. This control system comprises a split injection controller for splitting a primary injection of the fuel by each fuel injector near top dead center of the compression stroke of the cylinder into a plurality of split injections, one split injection being followed by the next split injection after an injection intermission interval which is a period lasting until the fuel injector is opened next following closing thereof; a judger for judging that a completion timing of the final split injection of the primary injection is later than a point of time corresponding to a specified crank angle: a corrector for reducing an amount of fuel to be sprayed during the primary injection for correction when the judger judges that the primary injection completion timing is later than the point of time corresponding to the specified crank angle; and an auxiliary injection controller for causing the fuel injectors to perform an auxiliary injection of the fuel in response to the correction of the corrector to reduce the amount of fuel to be sprayed.

With this construction, when the primary injection of the fuel at a point of time near top dead center of the compression stroke of each cylinder is split into a plurality of split injections by the split injection controller while the engine is operated, the corrector reduces the amount of fuel to be sprayed during the primary injection to advance the injection completion timing if the judger judges that the completion timing of the final split injection of the primary injection is later than the point of time corresponding to the specified crank angle. Thus, similar to the first aspect of the invention, deterioration of fuel consumption and an increase in incompletely combusted gases can be prevented. Further, since the fuel is auxiliarily sprayed by the auxiliary injection controller so as to respond to the correction to reduce the amount of fuel to be sprayed, an output torque will not fall. The auxiliary injection is preferably performed, for example, during an intake stroke or compression stroke of the cylinder.

Preferably, the split injection controller may controllably split the primary injection into split injections even if the fuel is auxiliarily sprayed by the auxiliary injection controller. This improves the state of combustion by splitting the primary injection, thereby realizing an improvement in fuel consumption and a reduction in emissions.

Preferably, a turbosupercharger may be further provided for supercharging an intake air by an exhaust gas of the engine, and the split injection controller splits the primary injection into a larger number of split injections when the engine is in an accelerative operating condition than when it is in a usual operating condition. With such a control, the acceleration performance of the engine can be improved and the correction to advance the injection completion timing becomes particularly effective.

This application is based on patent application No. 11-231358 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A fuel injection control system for a diesel engine, comprising:
    a fuel injector for directly spraying fuel into a combustion chamber in a cylinder of the engine;
    a split injection controller for controlling the fuel injector to perform a primary injection of fuel at least at a point of time near top dead center of a compression stroke of the cylinder at a plurality of split injections, one split injection being followed by the next split injection after an injection intermission interval which is a period lasting until the fuel injector is opened next following closing thereof;
    a judger for judging that a completion timing of the final split injection of the primary injection is later than a point of time corresponding to a specified crank angle; and
    a corrector for correcting at least one of the number of split injections performed as the primary injection, the injection intermission interval and a fuel injection pressure so as to advance the injection completion timing when the judger judges that the primary injection completion timing is later than the point of time corresponding to the specified crank angle.

2. The fuel injection control system according to claim 1, wherein the judger judges the injection completion timing based on an amount of fuel to be sprayed during the primary injection and an engine rotation speed.

3. The fuel injection control system according to claim 2, further comprising a pressurized chamber for storing fuel in a state of a high pressure equal to or exceeding a fuel injection pressure, wherein the judger makes a judgment on the injection completion timing based on a pressure of the fuel in the pressurized chamber.

4. The fuel injection control system according to claim 1, wherein the specified crank angle for judging the injection completion timing is such a most retarded crank angle that the fuel sprayed up to a point of time corresponding to the crank angle can continue to be burnt with the previously sprayed fuel.

5. The fuel injection control system according to claim 1, wherein the judger judges that the completion timing of the primary injection is later than the point of time corresponding to the specified crank angle when the engine is in an accelerative operating condition and a rate of acceleration is larger than a predetermined value.

6. The fuel injection control system according to claim 5, further comprising a turbosupercharger for supercharging an intake air by an exhaust gas of the engine, wherein the split injection controller splits the primary injection into a larger number of split injections when the engine is in the accelerative operating condition than when it is in a usual operating condition.

7. A fuel injection control system for a diesel engine comprising:
    a fuel injector for directly spraying fuel into a combustion chamber in a cylinder of the engine;
    a split injection controller for controlling the fuel injector to perform a primary injection of fuel at least at a point of time near top dead center of a compression stroke of the cylinder at a plurality of split injections, one split injection being followed by the next split injection after an injection intermission interval which is a period lasting until the fuel injector is opened next following closing thereof;

a judger for judging that a completion timing of the final split injection of the primary injection is later than a point of time corresponding to a specified crank angle;

a corrector for reducing an amount of fuel to be sprayed during the primary injection for correction when the judger judges that the primary injection completion timing is later than the point of time corresponding to the specified crank angle; and an auxiliary injection controller for controlling the fuel injector to perform an auxiliary injection of fuel in response to the correction of the corrector to reduce the amount of fuel to be sprayed during the primary injection.

8. The fuel injection control system according to claim 7, wherein the split injection controller controllably splits the primary injection into split injections even if the fuel is auxiliarily sprayed by the auxiliary injection controller.

9. The fuel injection control system according to claim 7, further comprising a turbosupercharger for supercharging an intake air by an exhaust gas of the engine, wherein the split injection controller splits the primary injection into a larger number of split injections when the engine is in an accelerative operating condition than when it is in a usual operating condition.

* * * * *